United States Patent
Christie et al.

(10) Patent No.: US 9,817,436 B2
(45) Date of Patent: Nov. 14, 2017

(54) PORTABLE MULTIFUNCTION DEVICE, METHOD, AND GRAPHICAL USER INTERFACE FOR DISPLAYING USER INTERFACE OBJECTS ADAPTIVELY

(75) Inventors: Greg Christie, San Jose, CA (US); Imran Chaudhri, San Francisco, CA (US); Scott Forstall, Mountain View, CA (US); Stephen O. Lemay, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1942 days.

(21) Appl. No.: 11/961,760

(22) Filed: Dec. 20, 2007

(65) Prior Publication Data

US 2008/0165147 A1   Jul. 10, 2008

Related U.S. Application Data

(60) Provisional application No. 60/937,992, filed on Jun. 29, 2007, provisional application No. 60/937,993, (Continued)

(51) Int. Cl.
*G06F 3/06* (2006.01)
*G06F 1/16* (2006.01)
(Continued)

(52) U.S. Cl.
CPC .......... *G06F 1/1626* (2013.01); *G06F 1/1656* (2013.01); *G06F 1/1684* (2013.01);
(Continued)

(58) Field of Classification Search
USPC ........................................................ 715/783
See application file for complete search history.

(56) References Cited

U.S. PATENT DOCUMENTS 5,159,159 A * 10/1992 Asher .......................... 178/18.05
5,564,112 A * 10/1996 Hayes et al. .................. 715/863
(Continued)

FOREIGN PATENT DOCUMENTS

| EP | 1 231 535 A2 | 8/2002 | ............ G06F 3/033 |
| EP | 1231535 A2 * | 8/2002 | |
| EP | 1 557 774 A2 | 7/2005 | ............ G06F 17/30 |

OTHER PUBLICATIONS

"HP Compaq Tablet PC tc1100 Product Details" dated Jan. 29, 2005, downloaded on Mar. 11, 2011 from http://replay.waybackmachine.org/20050129053938/http://h18000.www1.hp.com/products/tabletpc/ on.*

(Continued)

*Primary Examiner* — Jeffrey A Gaffin
*Assistant Examiner* — Paul Thatcher
(74) *Attorney, Agent, or Firm* — Dentons US LLP

(57) ABSTRACT

A portable multifunction device identifies a plurality of user interface objects. If the user interface objects meet a first predefined condition, the device then displays at least two of the user interface objects on a touch screen display. If the user interface objects meet a second predefined condition, the device then divides the user interface objects into at least first and second groups of user interface objects and then displays a first group icon corresponding to the first group and at least one user interface object from the second group on the touch screen display. If the user interface objects meet a third predefined condition, the device divides the user interface objects into at least third and fourth groups of user interface objects. The device then displays a third group icon corresponding to the third group and a fourth group icon corresponding to the fourth group.

25 Claims, 17 Drawing Sheets

Related U.S. Application Data filed on Jun. 29, 2007, provisional application No. 60/879,469, filed on Jan. 8, 2007, provisional application No. 60/879,253, filed on Jan. 7, 2007.

(51) Int. Cl.
| | | |
|---|---|---|
| *G06F 3/0481* | (2013.01) | |
| *G06F 3/0488* | (2013.01) | |
| *H04M 1/725* | (2006.01) | |
| *G06F 11/14* | (2006.01) | |

(52) U.S. Cl.
CPC ...... *G06F 3/04817* (2013.01); *G06F 3/04886* (2013.01); *G06F 3/0643* (2013.01); *H04M 1/72522* (2013.01); *G06F 11/1435* (2013.01); *G06F 2200/1614* (2013.01); *H04M 2250/22* (2013.01)

(56) References Cited

U.S. PATENT DOCUMENTS

| | | | | |
|---|---|---|---|---|
| 5,784,061 | A | * | 7/1998 | Moran et al. ............... 715/863 |
| 5,861,886 | A | * | 1/1999 | Moran et al. ............... 715/863 |
| 5,880,743 | A | * | 3/1999 | Moran et al. ............... 345/473 |
| 6,185,574 | B1 | * | 2/2001 | Howard et al. |
| 6,341,280 | B1 | * | 1/2002 | Glass et al. ............... 707/754 |
| 6,525,749 | B1 | * | 2/2003 | Moran et al. ............... 715/863 |
| 6,772,173 | B1 | | 8/2004 | McGee et al. ............ 707/104.1 |
| 7,242,413 | B2 | * | 7/2007 | Chu et al. .................... 345/619 |
| 7,925,682 | B2 | * | 4/2011 | Moore et al. ............... 707/831 |
| 2002/0029247 | A1 | * | 3/2002 | Kawamoto ......... G06Q 10/107 709/206 |
| 2002/0080187 | A1 | * | 6/2002 | Lawton ....................... 345/810 |
| 2002/0097278 | A1 | * | 7/2002 | Mandler et al. ............. 345/854 |
| 2003/0218641 | A1 | * | 11/2003 | Longobardi ................ 345/853 |
| 2004/0177319 | A1 | | 9/2004 | Horn ........................ 715/501.1 |
| 2005/0160079 | A1 | | 7/2005 | Turski et al. .................... 707/3 |
| 2005/0289133 | A1 | * | 12/2005 | Arrouye et al. .................. 707/4 |
| 2006/0080386 | A1 | * | 4/2006 | Roykkee et al. ............ 709/203 |
| 2006/0123360 | A1 | * | 6/2006 | Anwar et al. ................ 715/810 |
| 2006/0242164 | A1 | * | 10/2006 | Evans et al. ................. 707/100 |
| 2007/0168875 | A1 | * | 7/2007 | Kowitz et al. ............... 715/764 |

OTHER PUBLICATIONS

"Dynamic folder creation to ease navigation" by Yiping Ye et al. Feb. 10, 2004, Motorola.*
"Quick Reference Guide for TouchStream ST/LP" by FingerWorks, 2003.*
"Cross-Browser.com: Fixed Table Headers" Downloaded from http://web.archive.org/web/20061205082655/http://cross-browser.com/x/examples/fixed_table_headers.html, on Aug. 22, 2011, Achieved by the Internet Wayback Machine Dec. 5, 2006.*
"SitePoint.com-Scrollable headers" Downloaded from http://web.archive.org/web/20061211090631/http://www.sitepoint.com/forums/showthread.php?t=442068 on Aug. 22, 2011, Achieved by the Internet Wayback Machine Dec. 11, 2006.*
Ye et al., "Dynamic Folder Creation to Ease Navigation," Motorola, Feb. 10, 2004, 3 pages.
International Search Report and Written Opinion for International Application No. PCT/US2007/088889 dated Jun. 30, 2008.

\* cited by examiner

PORTABLE MULTIFUNCTION DEVICE, METHOD, AND GRAPHICAL USER INTERFACE FOR DISPLAYING USER INTERFACE OBJECTS ADAPTIVELY

RELATED APPLICATIONS

This application claims priority to U.S. Provisional Patent Application Nos. 60/937,992, "Portable Multifunction Device, Method, and Graphical User Interface for Displaying User Interface Objects Adaptively," filed Jun. 22, 2007; 60/937,993, "Portable Multifunction Device," filed Jun. 29, 2007; 60/879,469, "Portable Multifunction Device," filed Jan. 8, 2007; 60/879,253, and "Portable Multifunction Device," filed Jan. 7, 2007. All of these applications are incorporated by reference herein in their entirety.

This application is related to the following applications: (1) U.S. patent application Ser. No. 10/188,182, "Touch Pad For Handheld Device," filed Jul. 1, 2002; (2) U.S. patent application Ser. No. 10/722,948, "Touch Pad For Handheld Device," filed Nov. 25, 2003; (3) U.S. patent application Ser. No. 10/643,256, "Movable Touch Pad With Added Functionality," filed Aug. 18, 2003; (4) U.S. patent application Ser. No. 10/654,108, "Ambidextrous Mouse," filed Sep. 2, 2003; (5) U.S. patent application Ser. No. 10/840,862, "Multipoint Touchscreen," filed May 6, 2004; (6) U.S. patent application Ser. No. 10/903,964, "Gestures For Touch Sensitive Input Devices," filed Jul. 30, 2004; (7) U.S. patent application Ser. No. 11/038,590, "Mode-Based Graphical User Interfaces For Touch Sensitive Input Devices" filed Jan. 18, 2005; (8) U.S. patent application Ser. No. 11/057,050, "Display Actuator," filed Feb. 11, 2005; (9) U.S. Provisional Patent Application No. 60/658,777, "Multi-Functional Hand-Held Device," filed Mar. 4, 2005; (10) U.S. patent application Ser. No. 11/367,749, "Multi-Functional Hand-Held Device," filed Mar. 3, 2006; and (11) U.S. Provisional Patent Application No. 60/824,769, "Portable Multifunction Device," filed Sep. 6, 2006. All of these applications are incorporated by reference herein in their entirety.

TECHNICAL FIELD

The disclosed embodiments relate generally to portable electronic devices, and more particularly, to portable multifunction devices that adaptively display user interface objects.

BACKGROUND

As portable electronic devices become more compact, and the number of functions performed by a given device increase, it has become a significant challenge to design a user interface that allows users to easily interact with a multifunction device. This challenge is particular significant for handheld portable devices, which have much smaller screens than desktop or laptop computers. This situation is unfortunate because the user interface is the gateway through which users receive not only content but also responses to user actions or behaviors, including user attempts to access a device's features, tools, and functions. Some portable communication devices (e.g., mobile telephones, sometimes called mobile phones, cell phones, cellular telephones, and the like) have resorted to adding more pushbuttons, increasing the density of push buttons, overloading the functions of pushbuttons, or using complex menu systems to allow a user to access, store and manipulate data. These conventional user interfaces often result in complicated key sequences and menu hierarchies that must be memorized by the user.

Many conventional user interfaces, such as those that include physical pushbuttons, are also inflexible. This is unfortunate because it may prevent a user interface from being configured and/or adapted by either an application running on the portable device or by users. When coupled with the time consuming requirement to memorize multiple key sequences and menu hierarchies, and the difficulty in activating a desired pushbutton, such inflexibility is frustrating to most users.

Moreover, the conventional user interfaces often present information in a fixed, rigid manner regardless of the amount of information to be presented. If the amount of information (especially if the information has a hierarchical structure) grows over time, the conventional user interfaces often fail to render information in an effective and intuitive way.

Accordingly, there is a need for portable multifunction devices with more transparent and intuitive user interfaces that display user interface objects adaptively, which are easy to use and configure. Such interfaces increase the effectiveness, efficiency and user satisfaction with portable multifunction devices.

SUMMARY

The above deficiencies and other problems associated with user interfaces for portable devices are reduced or eliminated by the disclosed portable multifunction device. In some embodiments, the device has a touch-sensitive display (also known as a "touch screen") with a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. In some embodiments, the functions may include telephoning, video conferencing, e-mailing, instant messaging, blogging, digital photographing, digital videoing, web browsing, digital music playing, and/or digital video playing. Instructions for performing these functions may be included in a computer program product configured for execution by one or more processors.

One aspect of the invention involves a computer-implemented method performed by a portable multifunction device with a touch screen display. The device identifies first and second groups of user interface objects and displays the two groups of user interface objects on the touch screen display if they meet a first predefined condition. Otherwise, if the two groups of user interface objects meet a second predefined condition, the device displays a first group icon corresponding to the first group of user interface objects and the second group of user interface objects on the touch screen display. But if the two groups of user interface objects meet a third predefined condition, the device then displays the first group icon and a second group icon corresponding to the second group of user interface objects on the touch screen display.

Another aspect of the invention involves a computer-implemented method performed by a portable multifunction device with a touch screen display for displaying a plurality of user interface objects. If the plurality of user interface objects meet a first predefined condition, the device then displays at least two of the plurality of user interface objects on the touch screen display. If the plurality of user interface objects meet a second predefined condition, the device then divides the plurality of user interface objects into at least first and second groups of user interface objects. The device then displays a first group icon corresponding to the first group of user interface objects and at least one of the second group of user interface objects on the touch screen display. If the plurality of user interface objects meet a third predefined condition, the device divides the plurality of user interface objects into at least third and fourth groups of user interface objects. The device then displays a third group icon corresponding to the third group of user interface objects and a fourth group icon corresponding to the fourth group of user interface objects on the touch screen display.

Another aspect of the invention involves a graphical user interface on a portable electronic device with a touch screen display. The graphical user interface renders a plurality of user interface objects in such a manner: if the plurality of user interface objects meet a first predefined condition, at least two of the plurality of user interface objects are displayed on the touch screen display; if the plurality of user interface objects meet a second predefined condition, the plurality of user interface objects are then divided into at least first and second groups of user interface objects and a first group icon corresponding to the first group of user interface objects and at least one of the second group of user interface objects are displayed on the touch screen display; and if the plurality of user interface objects meet a third predefined condition, the plurality of user interface objects are divided into at least third and fourth groups of user interface objects and a third group icon corresponding to the third group of user interface objects and a fourth group icon corresponding to the fourth group of user interface objects are displayed on the touch screen display.

Another aspect of the invention involves a portable electronic device with a touch screen display for displaying a plurality of user interface objects. The device includes one or more processors, memory, and a program stored in the memory and configured to be executed by the one or more processors. The program includes: instructions for displaying at least two of the plurality of user interface objects on the touch screen display, if the plurality of user interface objects meet a first predefined condition; instructions for dividing the plurality of user interface objects into at least a first group of user interface objects and a second group of user interface objects, if the plurality of user interface objects meet a second predefined condition; instructions for displaying a first group icon corresponding to the first group of user interface objects and for displaying at least one of the second group of user interface objects on the touch screen display, if the plurality of user interface objects meet the second predefined condition; instructions for dividing the plurality of user interface objects into at least a third group of user interface objects and a fourth group of user interface objects, if the plurality of user interface objects meet a third predefined condition; and instructions for displaying a third group icon corresponding to the third group of user interface objects and a fourth group icon corresponding to the fourth group of user interface objects on the touch screen display, if the plurality of user interface objects meet the third predefined condition.

Another aspect of the invention involves a computer readable storage medium that stores one or more programs. The one or more programs include instructions that, when executed by a portable electronic device with a touch screen display with a plurality of user interface objects, cause the device to: display at least two of the plurality of user interface objects on the touch screen display, if the plurality of user interface objects meet a first predefined condition; divide the plurality of user interface objects into at least a first group of user interface objects and a second group of user interface objects, if the plurality of user interface objects meet a second predefined condition, and display a first group icon corresponding to the first group of user interface objects and display at least one of the second group of user interface objects on the touch screen display; and divide the plurality of user interface objects into at least a third group of user interface objects and a fourth group of user interface objects, if the plurality of user interface objects meet a third predefined condition, and display a third group icon corresponding to the third group of user interface objects and a fourth group icon corresponding to the fourth group of user interface objects on the touch screen display.

Another aspect of the invention involves a portable electronic device with a touch screen display with a plurality of user interface objects. The device includes: means for displaying at least two of the plurality of user interface objects on the touch screen display, if the plurality of user interface objects meet a first predefined condition; means for dividing the plurality of user interface objects into at least a first group of user interface objects and a second group of user interface objects, if the plurality of user interface objects meet a second predefined condition; means for displaying a first group icon corresponding to the first group of user interface objects and for displaying at least one of the second group of user interface objects on the touch screen display, if the plurality of user interface objects meet the second predefined condition; means for dividing the plurality of user interface objects into at least a third group of user interface objects and a fourth group of user interface objects, if the plurality of user interface objects meet a third predefined condition; and means for displaying a third group icon corresponding to the third group of user interface objects and a fourth group icon corresponding to the fourth group of user interface objects on the touch screen display, if the plurality of user interface objects meet the third predefined condition.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
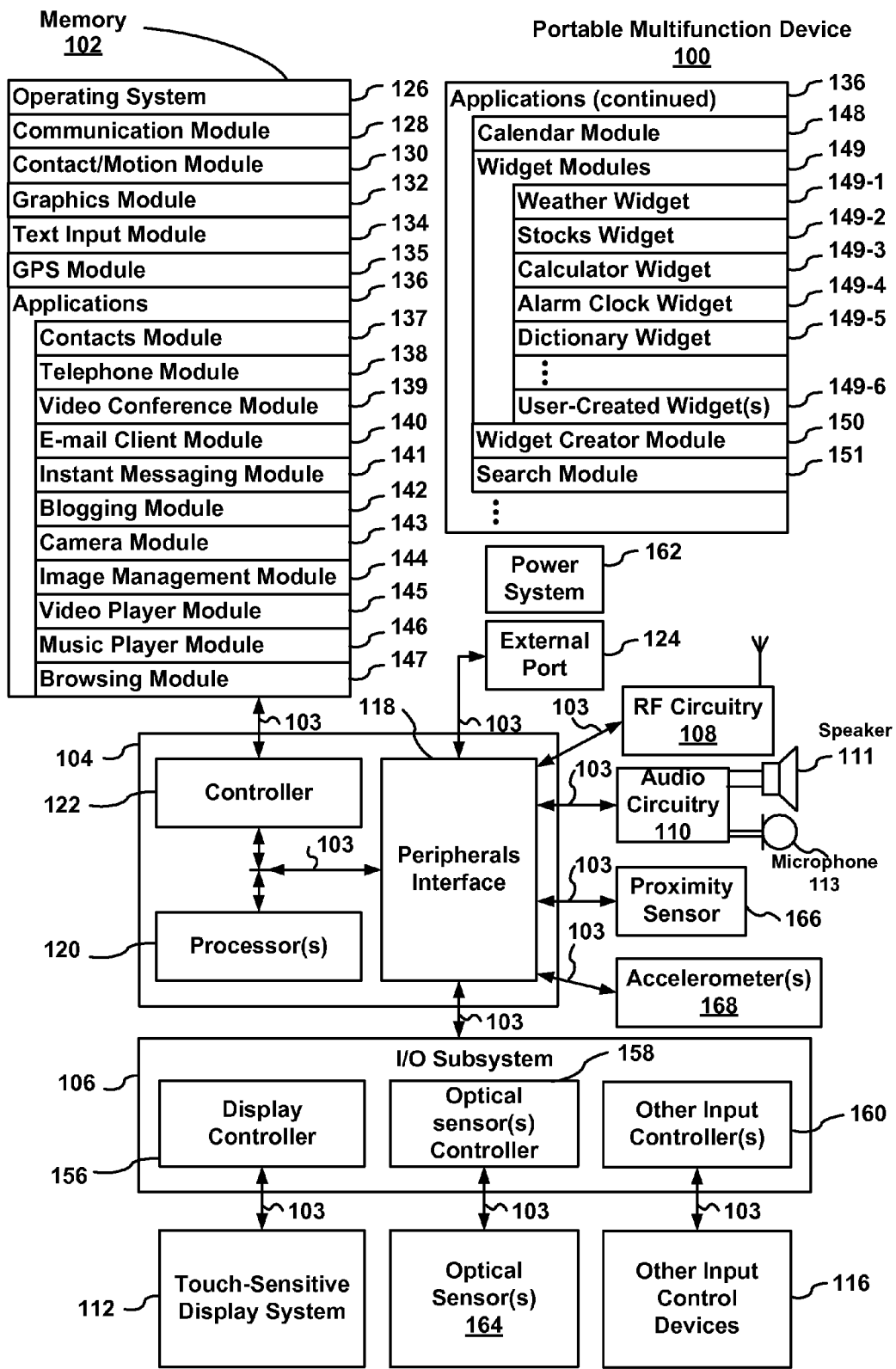
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first gesture could be termed a second gesture, and, similarly, a second gesture could be termed a first gesture, without departing from the scope of the present invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of a portable multifunction device, user interfaces for such devices, and associated processes for using such devices are described. In some embodiments, the device is a portable communications device such as a mobile telephone that also contains other functions, such as PDA and/or music player functions.

The user interface may include a physical click wheel in addition to a touch screen or a virtual click wheel displayed on the touch screen. A click wheel is a user-interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel or the center of the wheel. Alternatively, breaking contact with a click wheel image on a touch screen surface may indicate a user command corresponding to selection. For simplicity, in the discussion that follows, a portable multifunction device that includes a touch screen is used as an exemplary embodiment. It should be understood, however, that some of the user interfaces and associated processes may be applied to other devices, such as personal computers and laptop computers, which may include one or more other physical user-interface devices, such as a physical click wheel, a physical keyboard, a mouse and/or a joystick.

The device supports a variety of applications, such as a telephone application, a video conferencing application, an e-mail application, an instant messaging application, a blogging application, a digital camera application, a digital video camera application, a web browsing application, a digital music player application, and/or a digital video player application.

The various applications that may be executed on the device may use at least one common physical user-interface device, such as the touch screen. One or more functions of the touch screen as well as corresponding information displayed on the device may be adjusted and/or varied from one application to the next and/or within a respective application. In this way, a common physical architecture (such as the touch screen) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
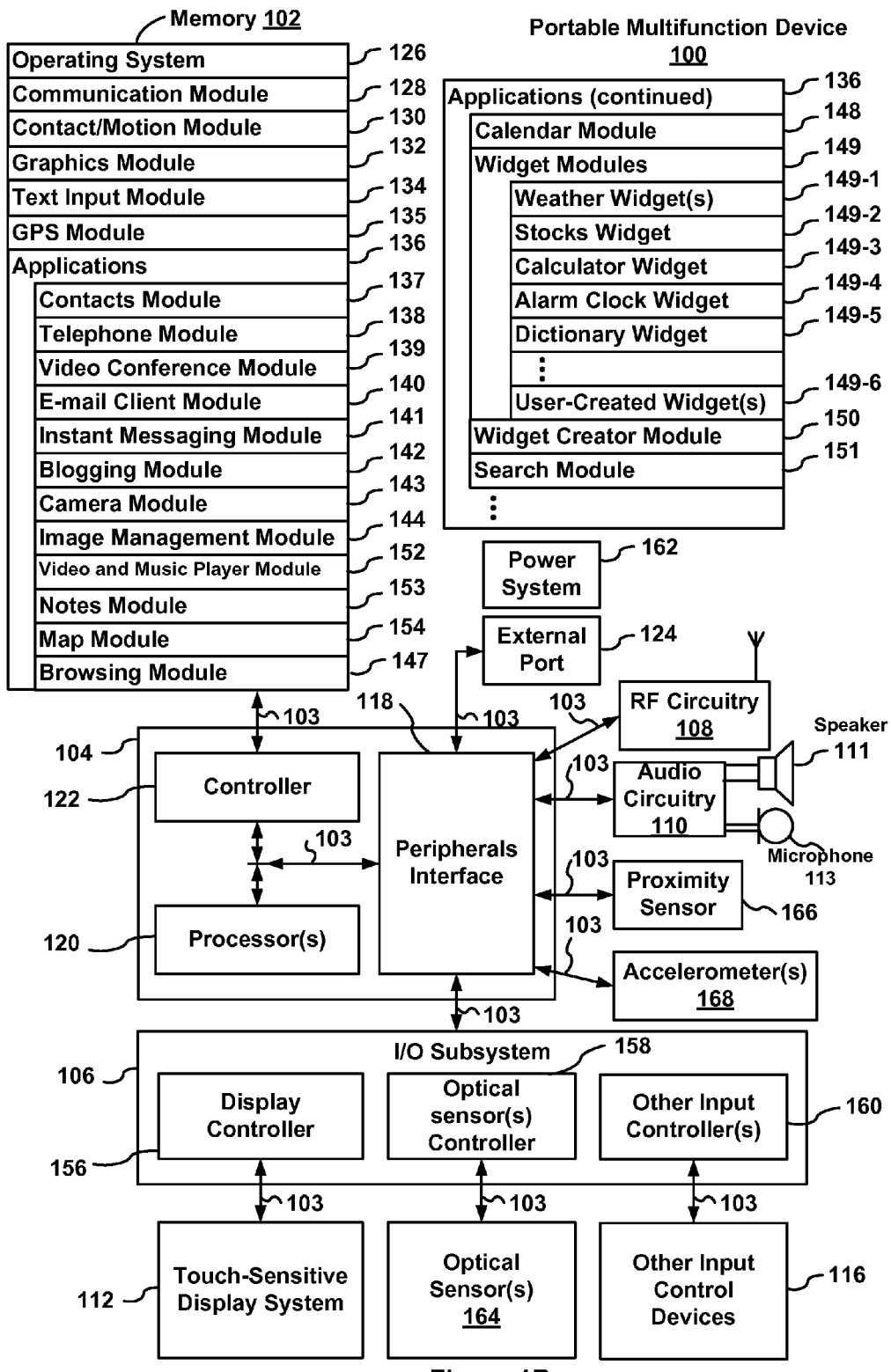

Attention is now directed towards embodiments of the device. FIGS. 1A and 1B are block diagrams illustrating portable multifunction devices 100 with touch-sensitive displays 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIGS. 1A and 1B may be implemented in hardware, software or a combination of hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects, further details of which are described below.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112.

A touch-sensitive display in some embodiments of the touch screen 112 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, a touch screen 112 displays visual output from the portable device 100, whereas touch sensitive tablets do not provide visual output.

A touch-sensitive display in some embodiments of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (henceforth referred to as icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIGS. 1A and 1B show an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIGS. 1A and 1B show a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector In Handheld Device," filed Sep. 30, 2005; Ser. No. 11/240,788, "Proximity Detector In Handheld Device," filed Sep. 30, 2005; number to be determined, "Using Ambient Light Sensor To Augment Proximity Sensor Output," filed Jan. 7, 2007; number to be determined, "Automated Response To And Sensing Of User Activity In Portable Devices," filed Oct. 24, 2006; and number to be determined, "Methods And Systems For Automatic Configuration Of Peripherals," filed Dec. 12, 2006, which are hereby incorporated by reference in their entirety. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

The device 100 may also include one or more accelerometers 168. FIGS. 1A and 1B show an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated herein by reference in their entirety. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred, determining if there is movement of the contact and tracking the movement across the touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single point contacts (e.g., one finger contacts) or to multiple simultaneous contacts (e.g., "multitouch"/multiple finger contacts).

In some embodiments, the contact/motion module 130 and the display controller 156 also detects contact on a touchpad. In some embodiments, the contact/motion module 130 and the controller 160 detects contact on a click wheel.

The graphics module 132 includes various known software components for rendering and displaying graphics on the touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like.

The text input module 134, which may be a component of graphics module 132, provides soft keyboards for entering text in various applications (e.g., contacts 137, e-mail 140, IM 141, blogging 142, browser 147, and any other application that needs text input).

The GPS module 135 determines the location of the device and provides this information for use in various applications (e.g., to telephone 138 for use in location-based dialing, to camera 143 and/or blogger 142 as picture/video metadata, and to applications that provide location-based services such as weather widgets, local yellow page widgets, and map/navigation widgets).

The applications 136 may include the following modules (or sets of instructions), or a subset or superset thereof:
- a contacts module 137 (sometimes called an address book or contact list);
- a telephone module 138;
- a video conferencing module 139;
- an e-mail client module 140;
- an instant messaging (IM) module 141;
- a blogging module 142;
- a camera module 143 for still and/or video images;
- an image management module 144;
- a video player module 145;
- a music player module 146;
- a browser module 147;
- a calendar module 148;
- widget modules 149, which may include weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module 145 and music player module 146;
- notes module 153; and/or
- map module 154.

Examples of other applications 136 that may be stored in memory 102 include other word processing applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the videoconferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, image management module 144, and browsing module 147, the blogging module 142 may be used to send text, still images, video, and/or other graphics to a blog (e.g., the user's blog).

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Computer, Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

In conjunction with touch screen 112, display controller 156, contact module 130, graphics module 132, and text input module 134, the notes module 153 may be used to create and manage notes, to do lists, and the like.

In conjunction with RF circuitry 108, touch screen 112, display system controller 156, contact module 130, graphics module 132, text input module 134, GPS module 135, and browser module 147, the map module 154 may be used to receive, display, modify, and store maps and data associated with maps (e.g., driving directions; data on stores and other points of interest at or near a particular location; and other location-based data).

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
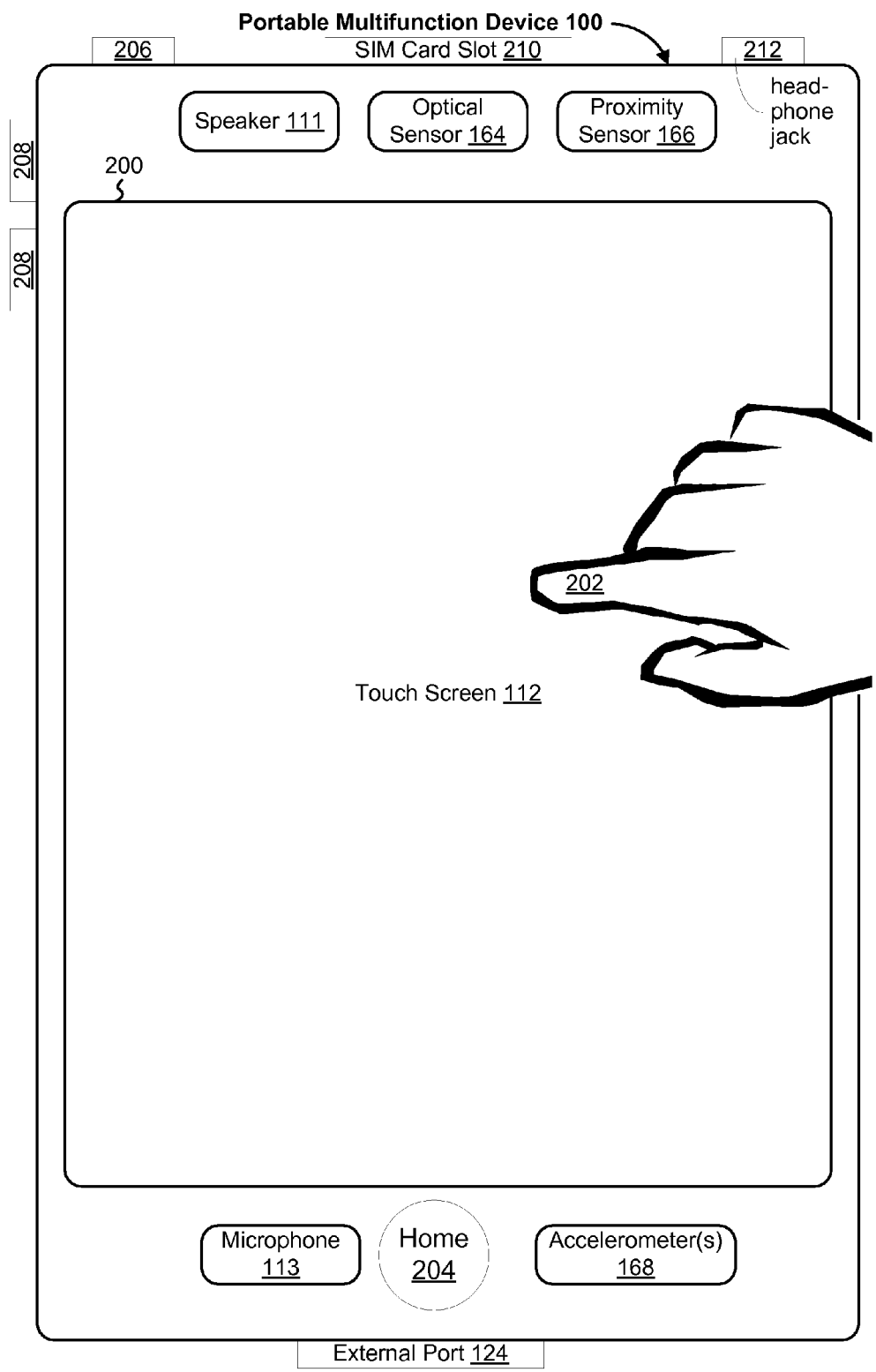
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, volume adjustment button(s) 208, a Subscriber Identity Module (SIM) card slot 210, a head set jack 212, and a docking/charging external port 124. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Attention is now directed towards embodiments of user interfaces ("UI") and associated processes that may be implemented on a portable multifunction device 100.

Figure 3:
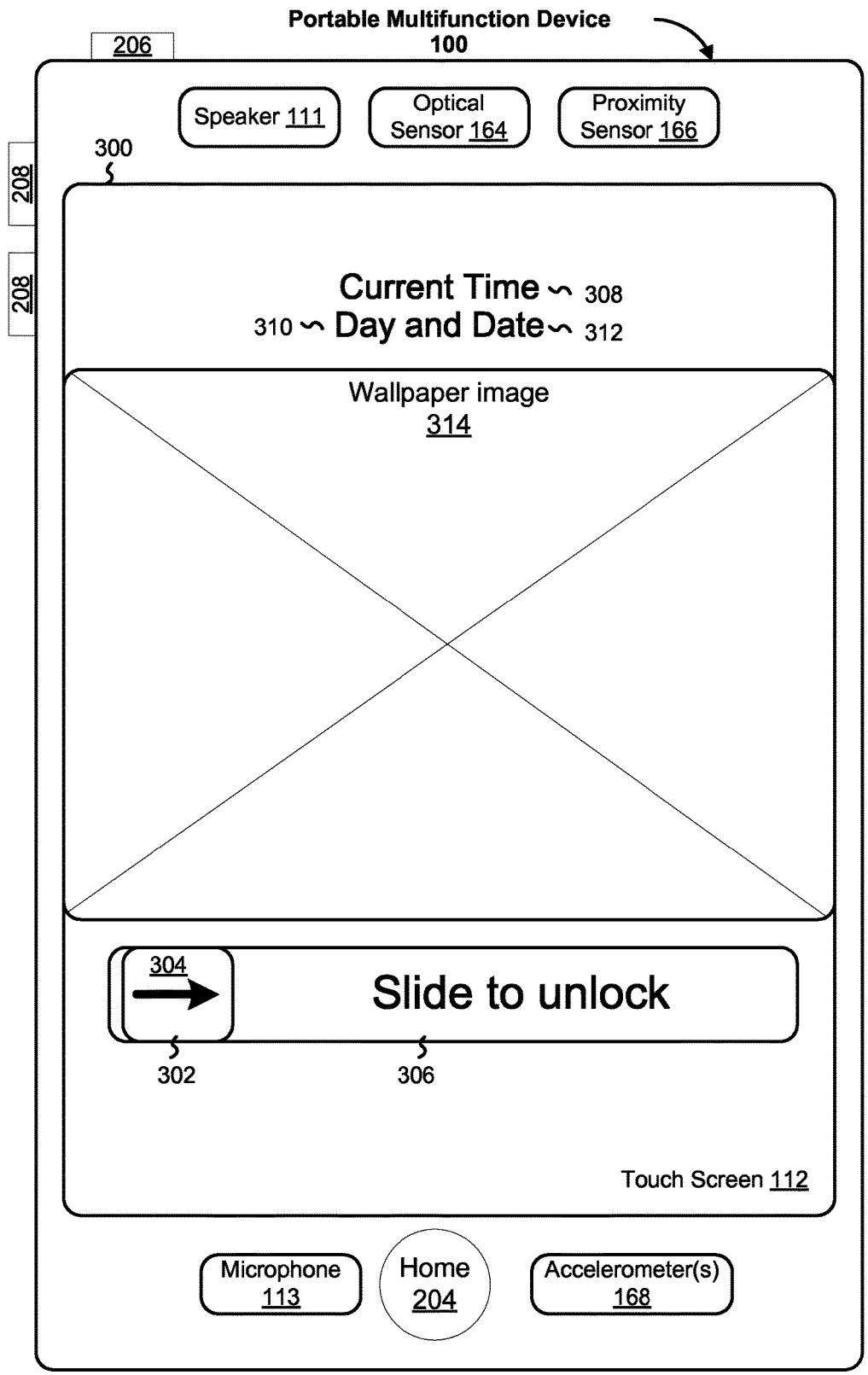
FIG. 3 illustrates an exemplary user interface for unlocking a portable electronic device in accordance with some embodiments.

FIG. 3 illustrates an exemplary user interface for unlocking a portable electronic device in accordance with some embodiments. In some embodiments, user interface 300 includes the following elements, or a subset or superset thereof:

Unlock image 302 that is moved with a finger gesture to unlock the device;
Arrow 304 that provides a visual cue to the unlock gesture;
Channel 306 that provides additional cues to the unlock gesture;
Time 308;
Day 310;
Date 312; and
Wallpaper image 314.

In some embodiments, the device detects contact with the touch-sensitive display (e.g., a user's finger making contact on or near the unlock image 302) while the device is in a user-interface lock state. The device moves the unlock image 302 in accordance with the contact. The device transitions to a user-interface unlock state if the detected contact corresponds to a predefined gesture, such as moving the unlock image across channel 306. Conversely, the device maintains the user-interface lock state if the detected contact does not correspond to the predefined gesture. As noted above, processes that use gestures on the touch screen to unlock the device are described in U.S. patent application Ser. No. 11/322,549, "Unlocking A Device By Performing Gestures On An Unlock Image," filed Dec. 23, 2005, and Ser. No. 11/322,550, "Indication Of Progress Towards Satisfaction Of A User Input Condition," filed Dec. 23, 2005, which are hereby incorporated by reference in their entirety.

Figure 4A:
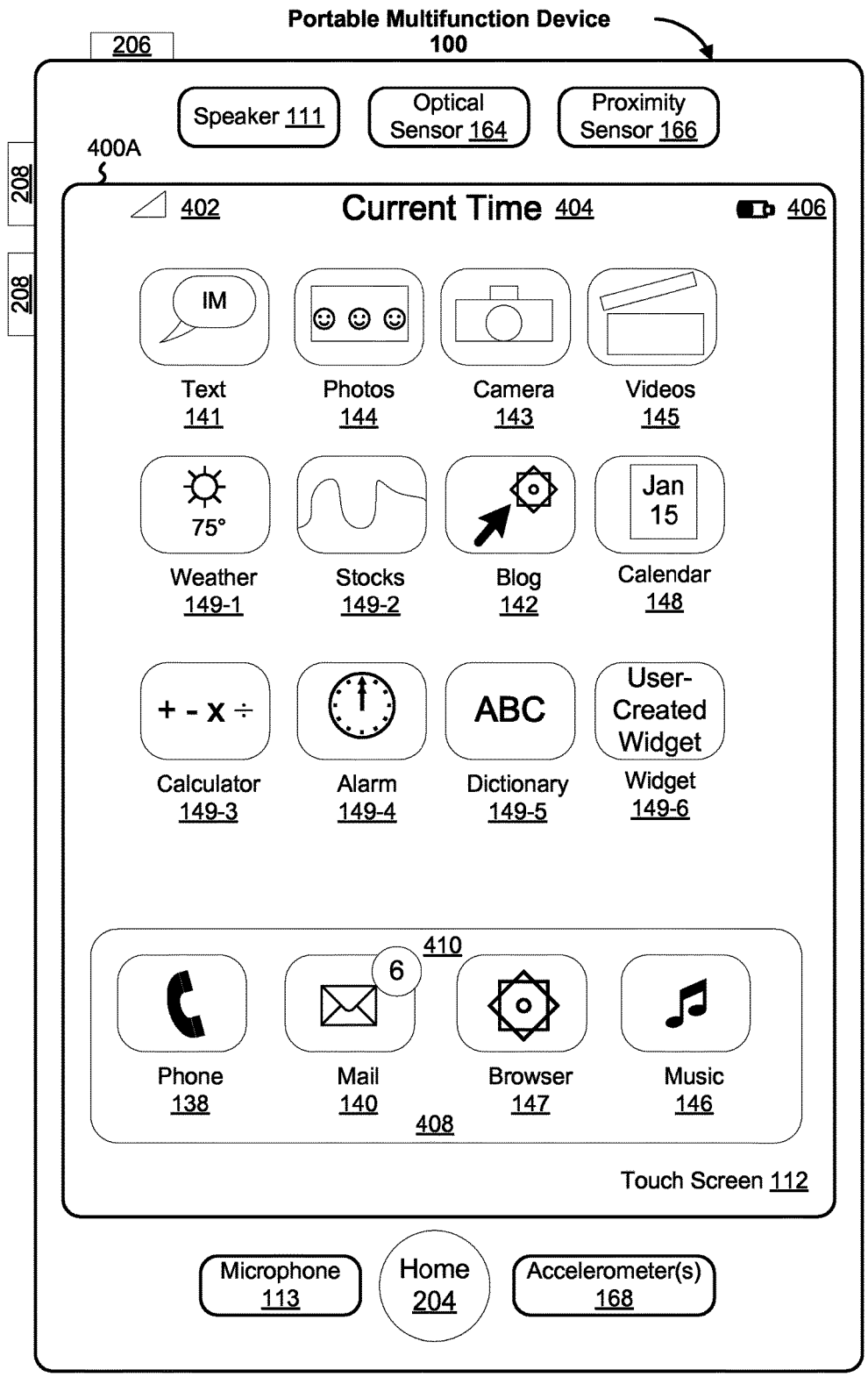
FIGS. 4A and 4B illustrate exemplary user interfaces for a menu of applications on a portable multifunction device in accordance with some embodiments.
Figure 4B:
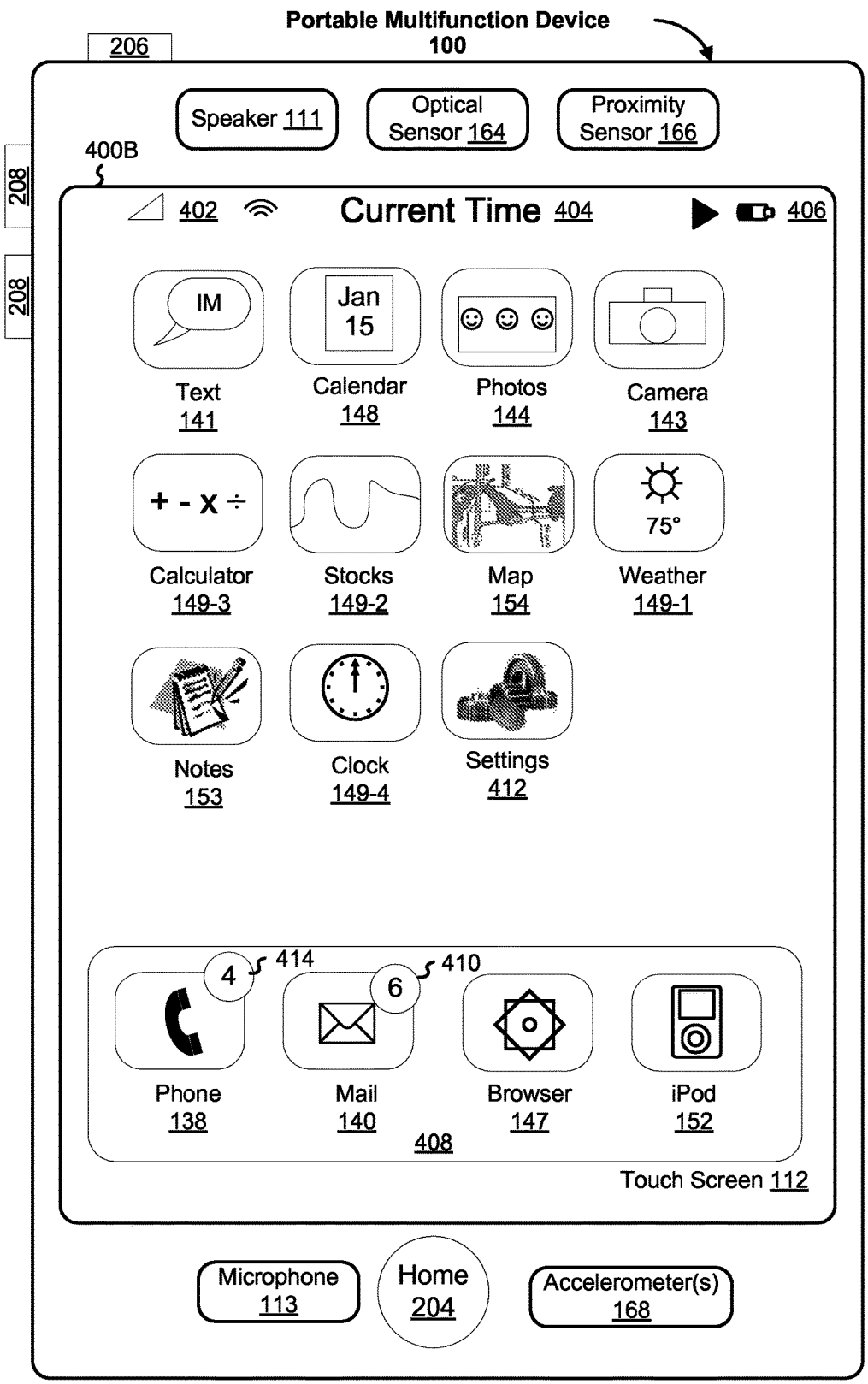

FIGS. 4A and 4B illustrate exemplary user interfaces for a menu of applications on a portable multifunction device in accordance with some embodiments. In some embodiments, user interface 400A includes the following elements, or a subset or superset thereof:

Signal strength indicator(s) 402 for wireless communication(s), such as cellular and Wi-Fi signals;
Time 404;
Battery status indicator 406;
Tray 408 with icons for frequently used applications, such as one or more of the following:
  Phone 138, which may include an indicator 414 of the number of missed calls or voicemail messages;
  E-mail client 140, which may include an indicator 410 of the number of unread e-mails;
  Browser 147; and
  Music player 146; and
Icons for other applications, such as one or more of the following:
  IM 141;
  Image management 144;
  Camera 143;
  Video player 145;
  Weather 149-1;
  Stocks 149-2;
  Blog 142;
  Calendar 148;
  Calculator 149-3;

Alarm clock 149-4;
Dictionary 149-5; and
User-created widget 149-6.

In some embodiments, user interface 400B includes the following elements, or a subset or superset thereof:
402, 404, 406, 141, 148, 144, 143, 149-3, 149-2, 149-1, 149-4, 410, 414, 138, 140, and 147, as described above;
Map 154;
Notes 153;
Settings 412, which provides access to settings for the device 100 and its various applications 136; and
Video and music player module 152, also referred to as iPod (trademark of Apple Computer, Inc.) module 152.

In some embodiments, UI 400A or 400B displays all of the available applications 136 on one screen so that there is no need to scroll through a list of applications (e.g., via a scroll bar). In some embodiments, as the number of applications increase, the icons corresponding to the applications may decrease in size so that all applications may be displayed on a single screen without scrolling. In some embodiments, having all applications on one screen and a menu button enables a user to access any desired application with at most two inputs, such as activating the menu button 204 and then activating the desired application (e.g., by a tap or other finger gesture on the icon corresponding to the application).

In some embodiments, UI 400A or 400B provides integrated access to both widget-based applications and non-widget-based applications. In some embodiments, all of the widgets, whether user-created or not, are displayed in UI 400A or 400B. In other embodiments, activating the icon for user-created widget 149-6 may lead to another UI that contains the user-created widgets or icons corresponding to the user-created widgets.

In some embodiments, a user may rearrange the icons in UI 400A or 400B, e.g., using processes described in U.S. patent application Ser. No. 11/459,602, "Portable Electronic Device With Interface Reconfiguration Mode," filed Jul. 24, 2006, which is hereby incorporated by reference in its entirety. For example, a user may move application icons in and out of tray 408 using finger gestures.

In some embodiments, UI 400A or 400B includes a gauge (not shown) that displays an updated account usage metric for an account associated with usage of the device (e.g., a cellular phone account), as described in U.S. patent application Ser. No. 11/322,552, "Account Information Display For Portable Communication Device," filed Dec. 23, 2005, which is hereby incorporated by reference in its entirety.

In some embodiments, the application modules described above may have different UI features depending on the type and amount of information provided by each individual application module. For example, the iPod module 152 provides an access to different kinds of entertainment items such as songs, music videos, and movies. The exact number of entertainment items stored in the portable device may range from several to several hundreds. These items are usually organized using a hierarchical directory structure having multiple folders, each folder hosting a set of entertainment items. For example, the directory structure may have a songs folder, a music videos folder, and a movies folder. In some embodiments, some of these folders may include several sub-folders, each sub-folder hosting a subset of the entertainment items.

With the limited space of a small portable device's screen display, one challenge is how to present these entertainment items with a hierarchical structure in an intuitive manner. Conventional portable devices (e.g., MP3 players) often adopt a rigid scheme for displaying these folders and the entertainment items therein through a user interface without considering the exact number of entertainment items in these folders. For example, even if the movie folder contains only one movie, the user still needs to perform multiple actions before the movie is being replayed, including accessing the movie folder, opening the movie folder, and playing the movie.

FIGS. 9A through 9G are graphical user interfaces illustrating an adaptive approach of presenting user interface objects on the touch screen display in accordance with some embodiments. For illustrative purpose, the video folder in the music and video player module is shown. But it will be apparent to one skilled in the art that this approach is readily applicable to many other occasions with little or no modification (e.g., for displaying notification information for communications received by the device but missed by the user of the device). The term "user interface object" generally refers to a graphical icon on the touch screen display, which may be associated with an entertainment item, an email message, a photo, a data file, or the like depending on the specific application that employs the schemes.

Figure 5:
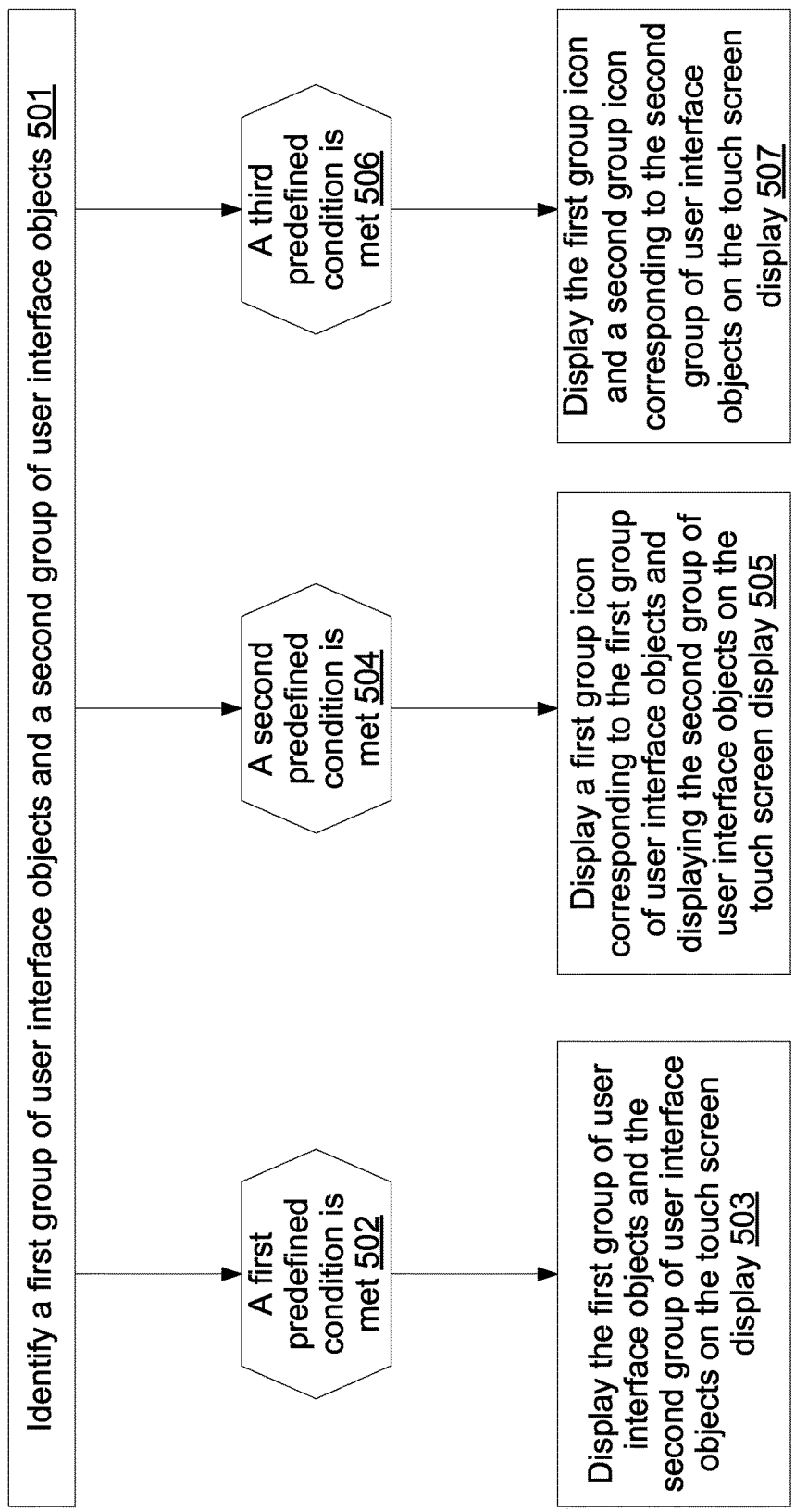
FIG. 5 is a flow diagram illustrating a first process for displaying a plurality of user interface objects in accordance with some embodiments.

FIG. 5 is a flow diagram illustrating a first process for displaying a plurality of user interface objects in accordance with some embodiments.

Upon a user selection of an application's icon, the portable device identifies multiple user interface objects associated with the application including a first group of user interface objects and a second group of user interface objects (501). In some embodiments, these two groups of user interface objects are within two separate folders (or sub-folders). But depending on the number of objects within the two groups, the portable device may or may not any folder (or sub-folder).

If the two groups of user interface objects meet a first predefined condition (502), the portable device then displays the individual user interface objects in the first and second groups on the touch screen display (503). In some embodiments, the device may display all the user interface objects on the touch screen display.

In some embodiments, the first predefined condition is that the number of user interface objects in each of the two groups is equal to or less than a predetermined threshold. In some other embodiments, the first predefined condition is that the total number of user interface objects in the two groups is equal to or less than a maximum number of user interface objects that can be simultaneously displayed on the touch screen display. Thus, although the two groups of user interface objects are within two separate folders (or sub-folders), the portable device may choose to directly display the individual user interface objects within the two folders (or sub-folders). The user is saved from performing additional actions that are required by the conventional schemes mentioned above.

Figure 9A:
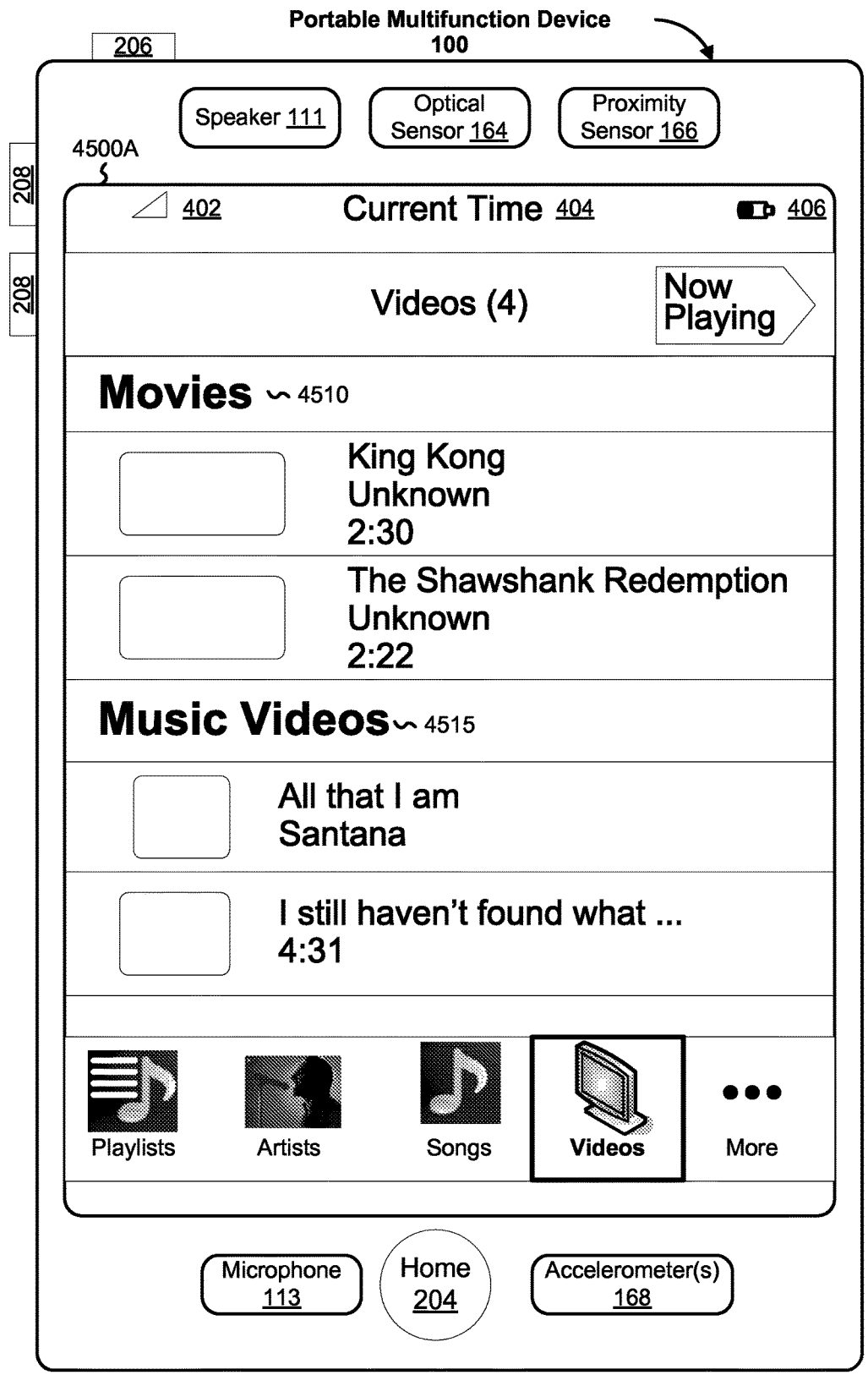
FIGS. 9A through 9G are graphical user interfaces illustrating an adaptive approach of presenting user interface objects on the touch screen display in accordance with some embodiments. For illustrative purpose, the video folder in the music and video player module is shown.

As shown in FIG. 9A, the video folder has only four objects including two movies and two music videos. Since information about the four objects can fit into the touch screen display, a hierarchical approach of grouping the movies into one sub-folder and the music videos into another sub-folder is probably less preferred. Rather, the four objects are shown in a flat view with two labels 4510 and 4515 indicating the two media types.

In some embodiments, the device may present the information in a flat view if the total number of user interface objects is slightly more than what can fit into the display. A user can easily scroll the flat view up or down to see the hidden portion using a substantially vertical finger swipe gesture.

If the two groups of user interface objects meet a second predefined condition (504), the portable device then displays a first group icon corresponding to the first group of user interface objects and displays individual objects in the second group on the touch screen display (505). A first group icon is displayed for the first group of user interface objects. For the second group of user interface objects, at least one group member is shown on the touch screen display.

In some embodiments, the second predefined condition is that the number of objects in the first group is greater than a predetermined threshold but the number of objects in the second group is still equal to or less than the predetermined threshold. As a result, the first group icon and one or more individual user interface objects can be simultaneously displayed on the touch screen display. In other words, although there is not enough room for displaying individual objects from both groups, the portable device concludes that it is possible to display at least one individual object from the second group (if this group has only a few objects) while representing the first group collectively using a group icon (if this group has many more objects). Thus, this hybrid object rendering approach also saves the user from performing some actions that would be inevitable according to the convention scheme.

Figure 9B:
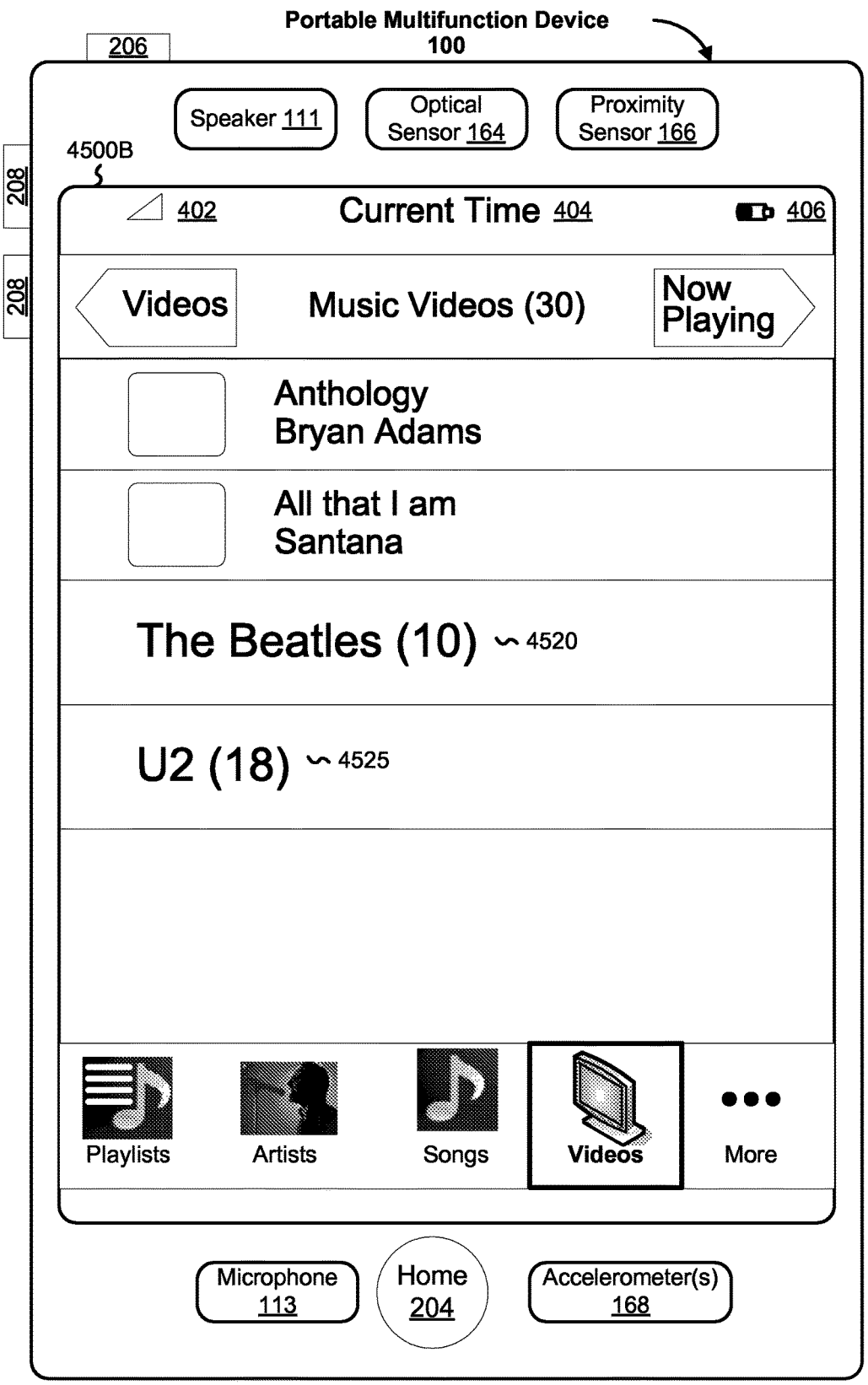

FIG. 9B depicts that there are 30 music videos in the music video folder in total by four different artists or groups, 10 by the Beatles, 18 by U2, one by Bryan Adams, and one by Santana. Given the size of the touch screen display, a flat view of all the 30 music videos is less convenient because this may require multiple finger swipe gestures to scan through all the objects. It is also less intuitive to tell the artist for each individual music video. On the other hand, it is inconvenient if the music videos by Santana and Bryan Adams each have their own sub-folder because a user has to open the sub-folder to see the music video's title while there is still blank space on the touch screen display.

Figure 9C:
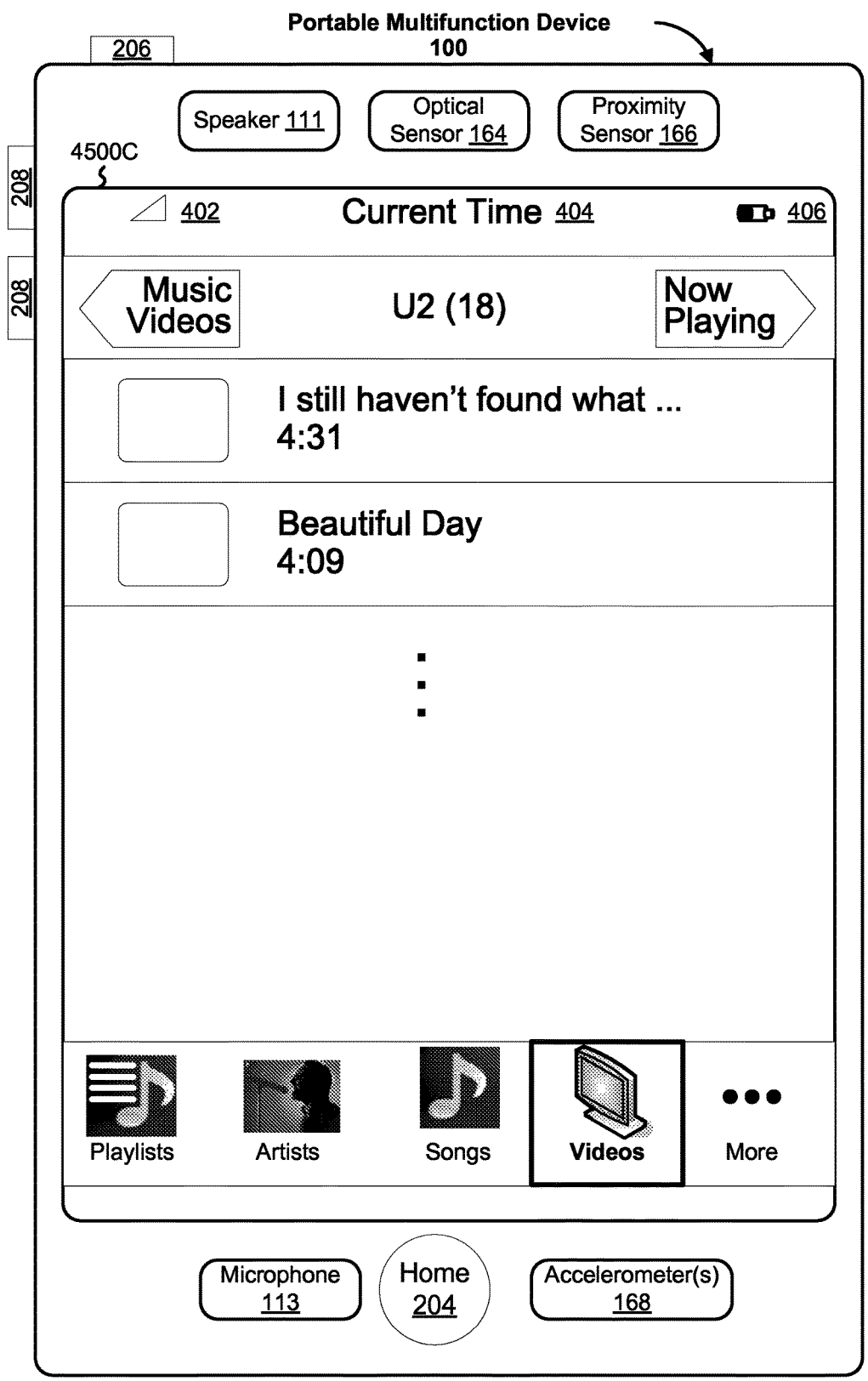

Rather, FIG. 9B is a hybrid view of information about the 30 music videos. A group icon 4520 is used for representing the Beatles' works and a group icon 4525 for the U2's works. The group icon indicates the number of music videos in that sub-folder. A user can simply finger tap a group icon, e.g., 4525, to learn more information about the 18 U2's music videos (FIG. 9C). The other two music videos are displayed as two separate items, each including information about the artist and the music video's title.

If the two groups of user interface objects meet a third predefined condition (506), the portable device then displays the first group icon and a second group icon corresponding to the second group of user interface objects on the touch screen display (507). A third group icon is displayed for the third group of user interface objects. A fourth group icon is displayed for the fourth group of user interface objects.

Figure 9D:
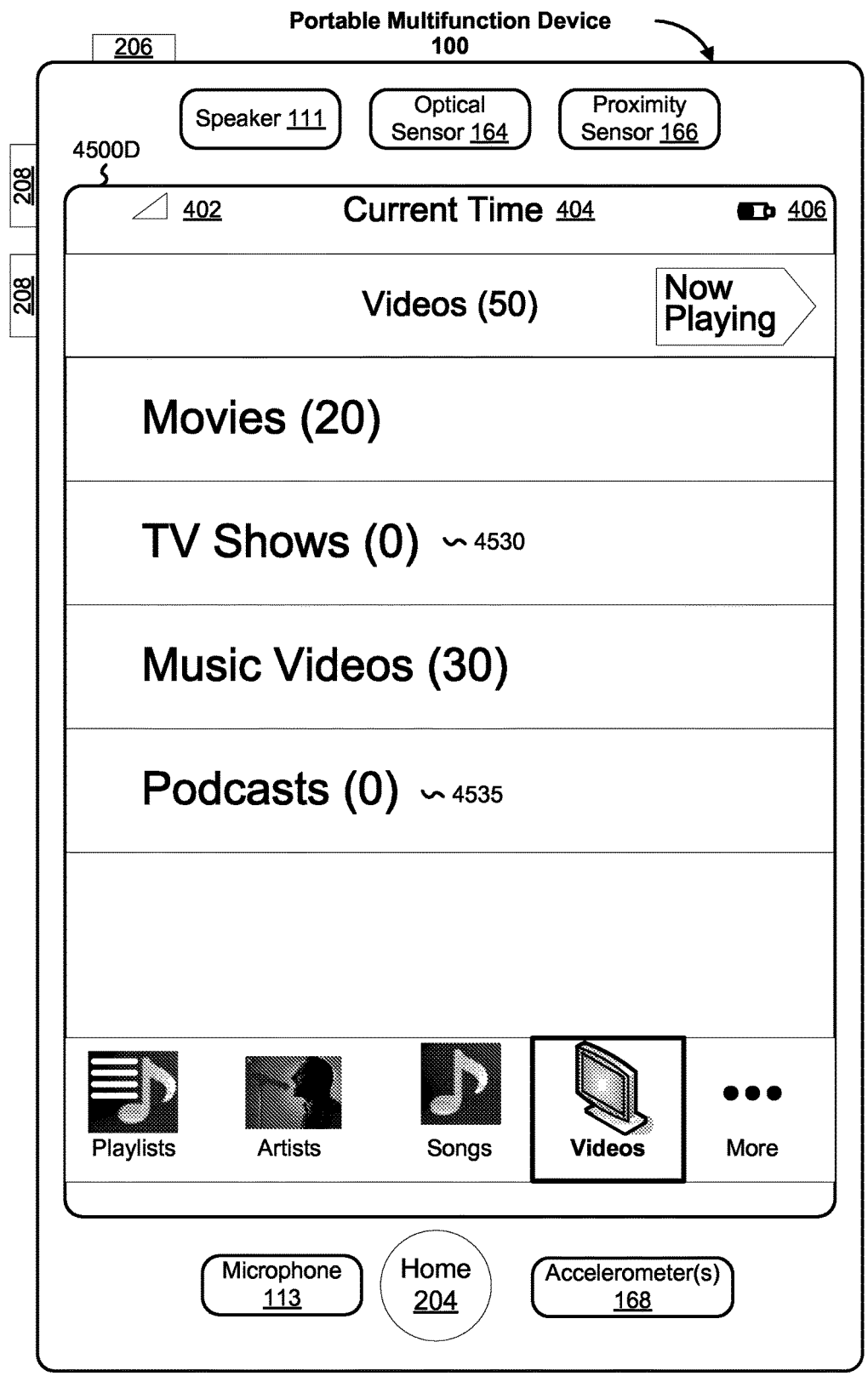

In some embodiments, the third predefined condition is that the number of objects in each of the two groups is greater than a predefined threshold such that the touch screen display does not have enough space for simultaneously individual objects from any of the two groups. In other words, the conventional rigid object rendering scheme is merely a special case of the adaptive object rendering scheme according to some embodiments of the invention. In some embodiments, as shown in FIG. 9D, a group icon (e.g., 4530 and 4535) is displayed on the touch screen display even if the corresponding group is empty.

Figure 9E:
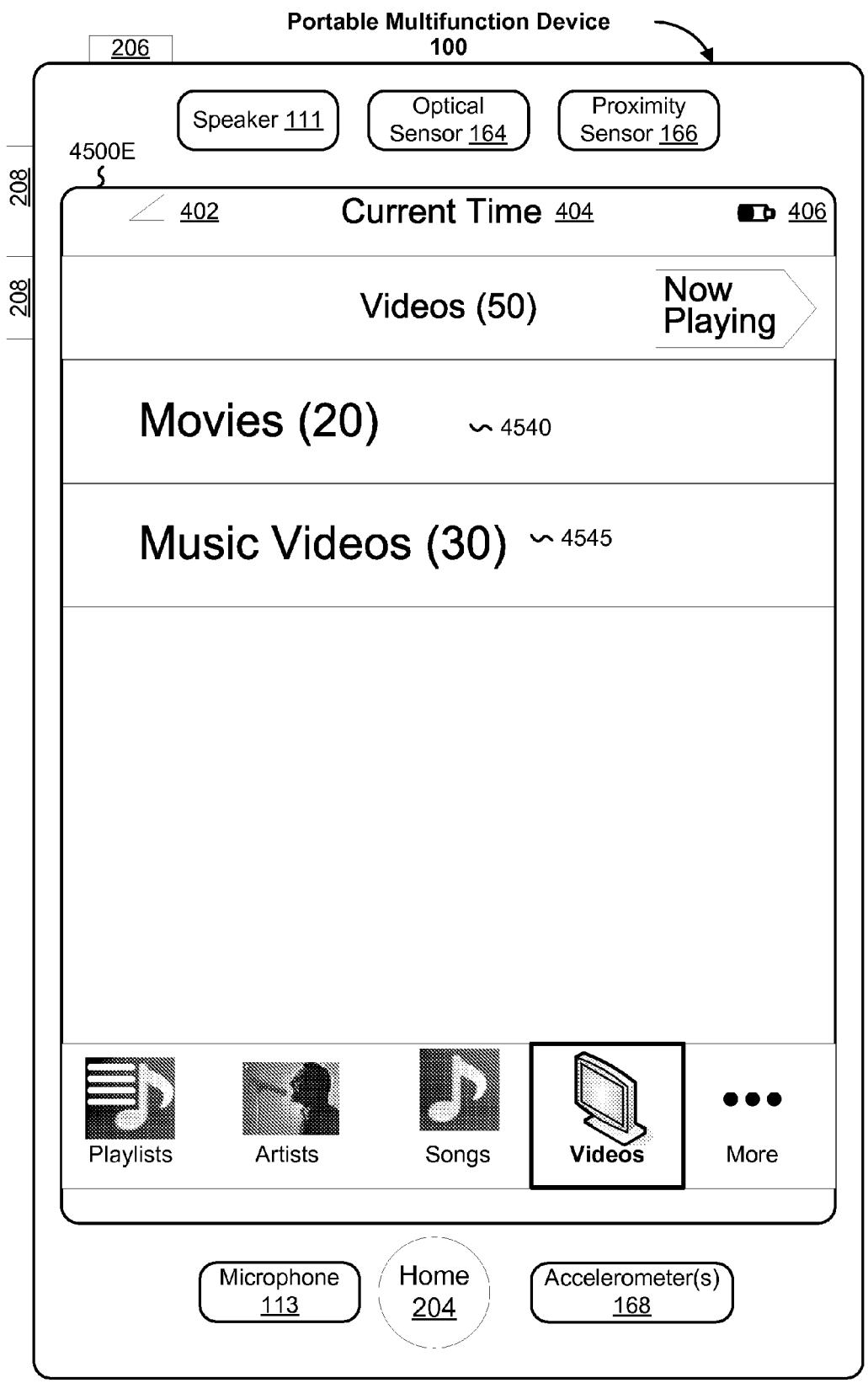

In some other embodiments, as shown in FIG. 9E, only a group icon (e.g., 4540 and 4545) whose associated group is not empty is displayed on the touch screen display. Each of the two groups has a sufficient number of objects that cannot fit into the touch screen display.

In some embodiments, the aforementioned information classification and presentation approach is an automatic and recursive process. Upon detecting a user selection of a respective group icon corresponding to the first, third or fourth groups of user interface objects, the device checks whether the user-selected group of user interface objects meet one of the first, second or third predefined conditions and then operates accordingly.

Figure 9F:
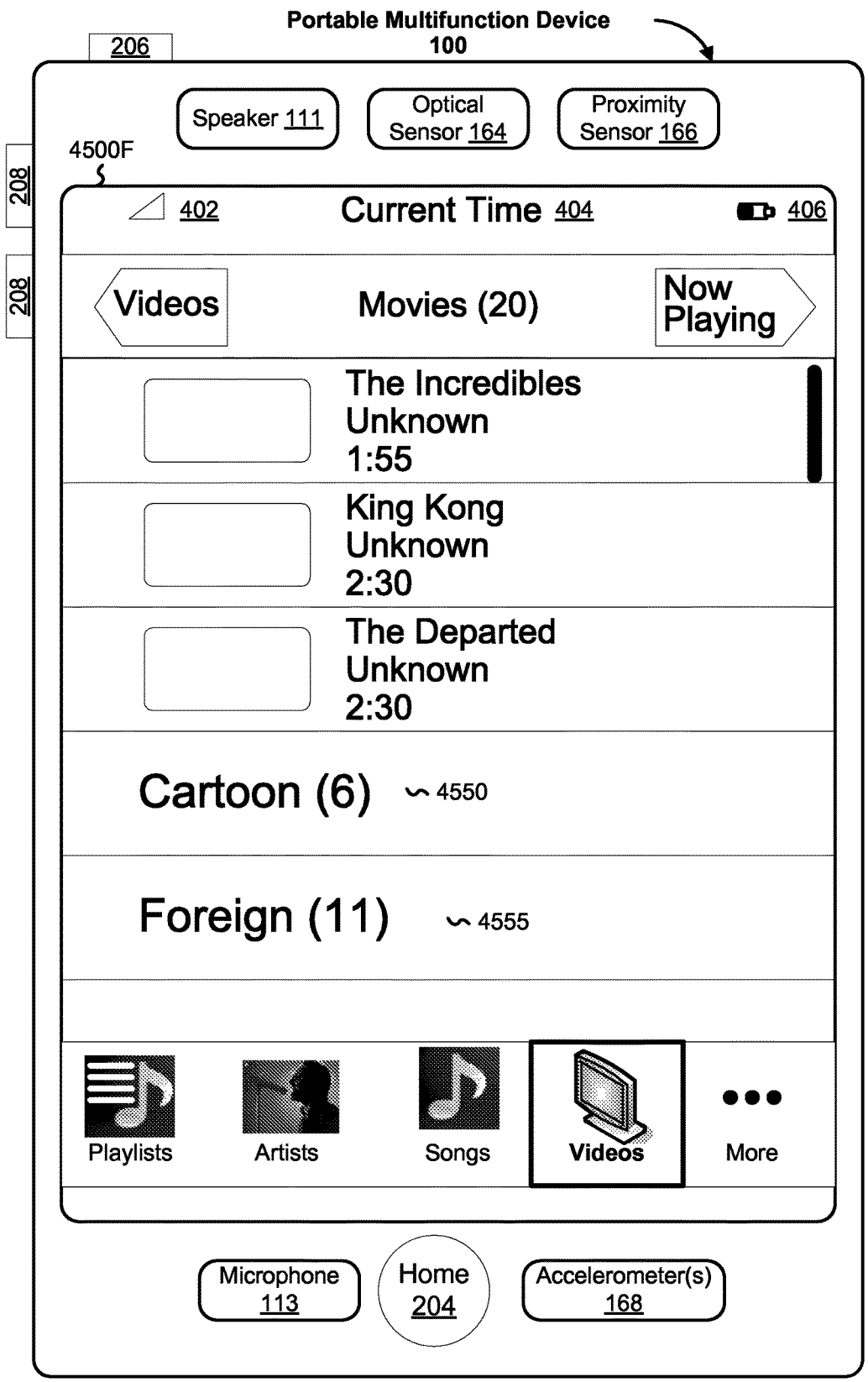

For example, in response to a user selection of the movies icon 4540, a hybrid view of the movie information is displayed in FIG. 9F. Like the hybrid view shown in FIG. 9B, three movies are shown as individual items with detailed information and the other 17 movies are broken into two sub-groups, each having its own group icon Cartoon (6) 4550 and Foreign (11) 4555.

Figure 6:
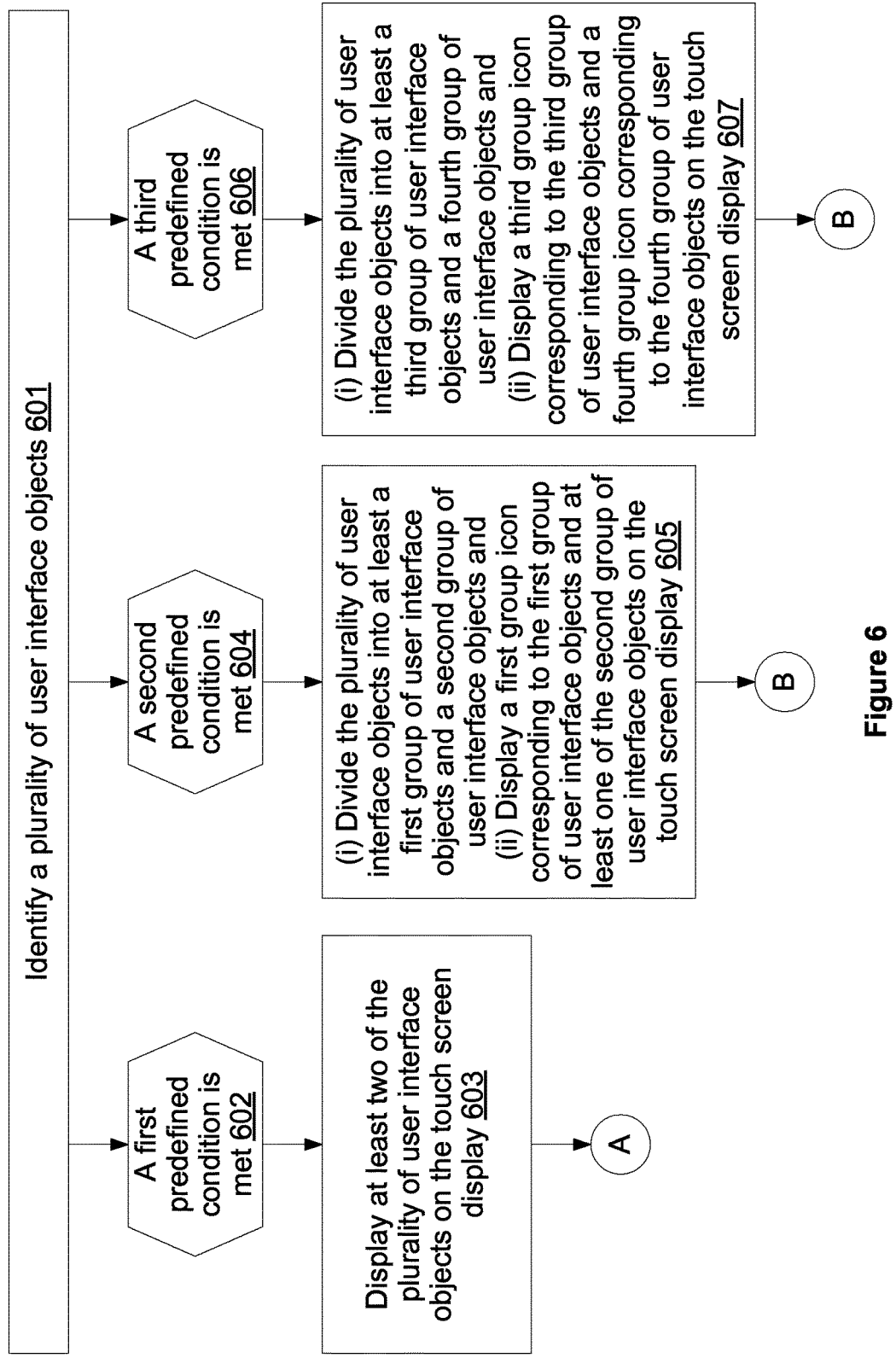
FIG. 6 is a flow diagram illustrating a second process for displaying a plurality of user interface objects in accordance with some embodiments.

FIG. 6 is a flow diagram illustrating a second process for displaying a plurality of user interface objects in accordance with some embodiments. Upon a user selection of an application's icon, the portable device identifies a plurality of user interface objects associated with the application (601).

If the plurality of user interface objects meet a first predefined condition (602), the portable device then displays at least two individual user interface objects on the touch screen display (603). In some embodiments, the first predefined condition is that the total number of user interface objects is equal to or less than a predetermined threshold. In some other embodiments, the first predefined condition is that the total number of user interface objects is equal to or less than a maximum number of user interface objects that can be simultaneously displayed on the touch screen display. In some embodiments, the portable device displays each of the plurality of user interface objects in the form of a user-scrollable list.

If the plurality of user interface objects meet a second predefined condition (604), the portable device divides the plurality of user interface objects into at least a first group of user interface objects and a second group of user interface objects and displays a first group icon corresponding to the first group of user interface objects and displays individual objects in the second group on the touch screen display (605). In some embodiments, the second predefined condition is that the number of objects in the first group is greater than a predetermined threshold but the number of objects in the second group is equal to or less than the predetermined threshold. As a result, the first group icon and one or more individual user interface objects can be simultaneously displayed on the touch screen display.

In some embodiments, the first group of user interface objects corresponds to a first information type (e.g., movies) and the second group of user interface objects corresponds to a second information type (e.g., music videos), which is different from the first information type.

In some other embodiments, the first group of user interface objects is associated with a first information source (e.g., television) and the second group of user interface objects is associated with a second information source (e.g., Podcast), which is different from the first information source. The two groups of user interface objects may share the same information type.

If the plurality of user interface objects meet a third predefined condition (606), the portable device then (i) divides the plurality of user interface objects into at least a third group of user interface objects and a fourth group of user interface objects and (ii) displays a third group icon corresponding to the third group of user interface objects and a fourth group icon corresponding to the fourth group of user interface objects on the touch screen display (607). In some embodiments, the third predefined condition is that the number of objects in each of the two groups is greater than a predefined threshold such that the touch screen display does not have enough space for simultaneously individual objects from any of the two groups.

Figure 7:
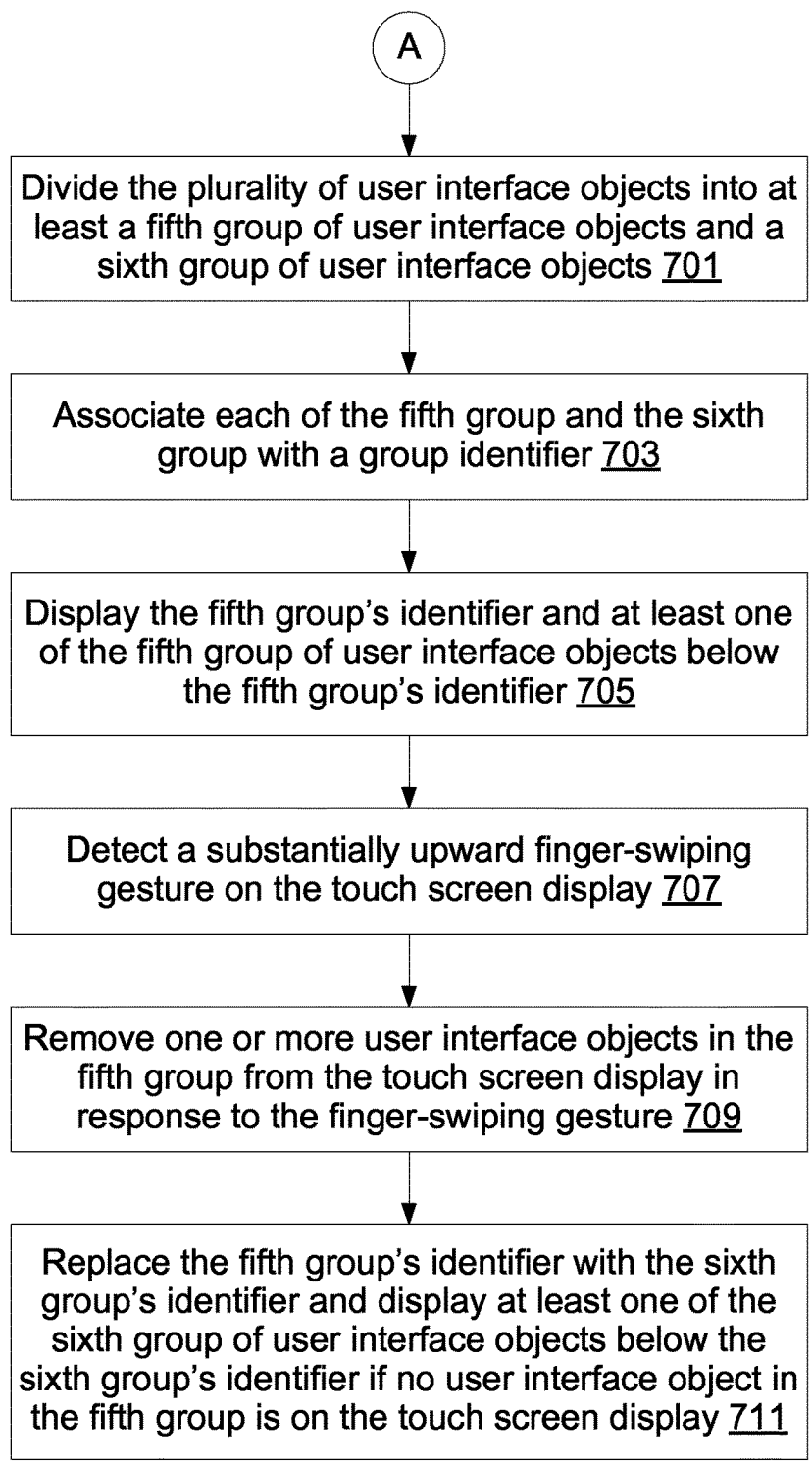
FIG. 7 is a flow diagram illustrating a third process for displaying a plurality of user interface objects in accordance with some embodiments.

FIG. 7 is a flow diagram illustrating a third process for displaying a plurality of user interface objects following the operation 603 shown in FIG. 6 in accordance with some embodiments.

The portable device divides the plurality of user interface objects into at least a fifth group of user interface objects and a sixth group of user interface objects (701). For each group of user interface objects, the portable device associates it with a group identifier (703).

The portable device displays the fifth group's group identifier and at least one of the fifth group of user interface objects below the fifth group's group identifier (705). Upon detecting a substantially upward finger-swiping gesture on the touch screen display (707), the portable device removes one or more user interface objects in the fifth group from the touch screen display in accordance with the finger-swiping gesture (709). In some embodiments, the removal of the user interface objects in the fifth group does not affect the fifth group's group identifier. But when the last user interface object in the fifth group is removed from the touch screen display, the portable device replaces the fifth group's identifier with the sixth group's identifier and also displays at least one of the sixth group of user interface objects below the sixth group's identifier (711).

Figure 8:
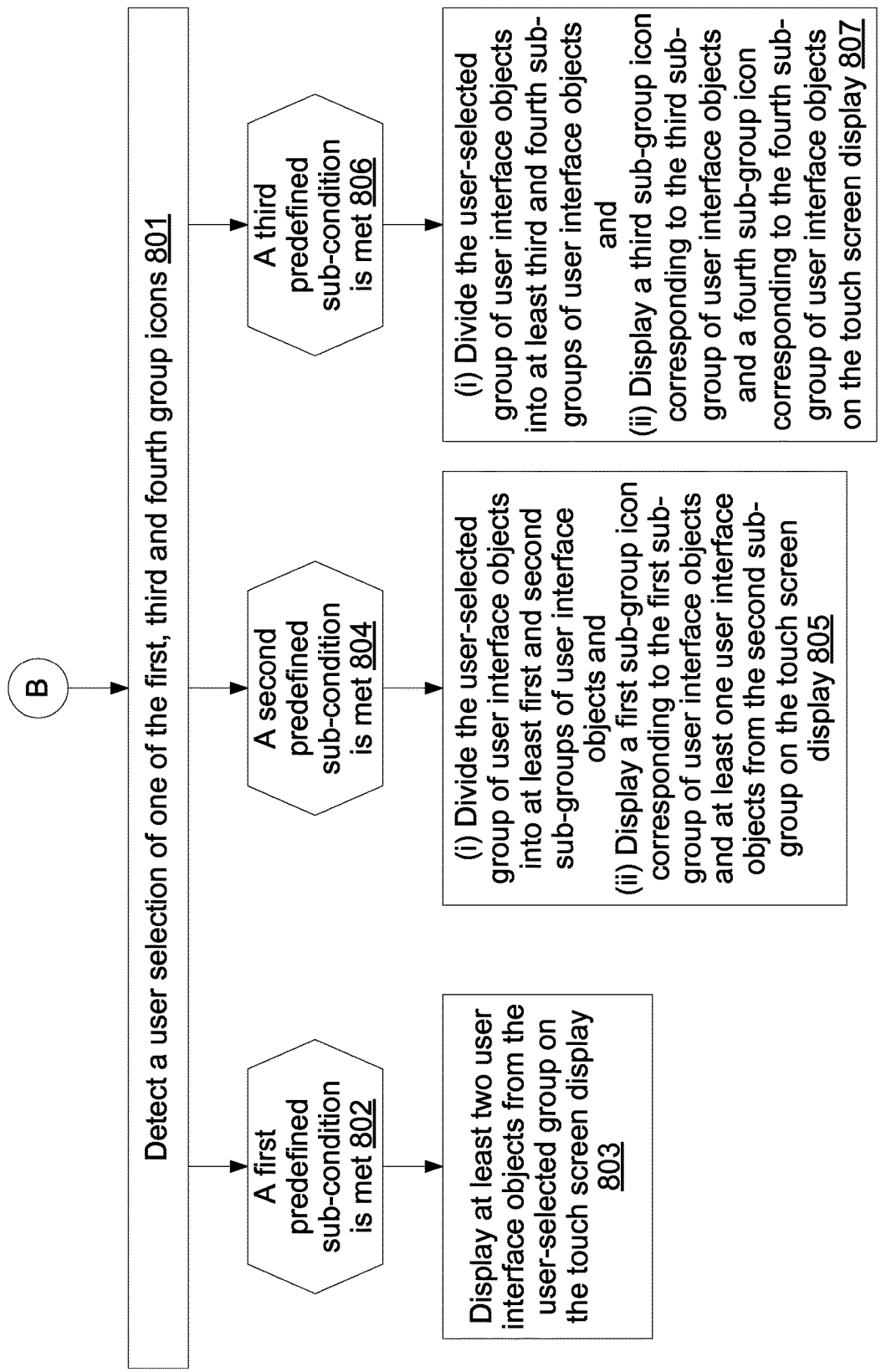
FIG. 8 is a flow diagram illustrating a fourth process for displaying a plurality of user interface objects in accordance with some embodiments.

FIG. 8 is a flow diagram illustrating a fourth process for displaying a plurality of user interface objects following the operations 605 or 607 shown in FIG. 6 in accordance with some embodiments.

Upon detecting a user selection of a respective group icon of the first, third and fourth group icons (801), the portable device identifies a respective user-selected group of user interface objects.

If the user-selected group of user interface objects meets a first predefined sub-condition (802), the portable device then displays at least two of the user-selected group of user interface objects on the touch screen display (803). In some embodiments, the first predefined sub-condition is similar to the first predefined condition described above in connection with FIG. 6.

If the user-selected group of user interface objects meets a second predefined sub-condition, the portable device then divides the group of user interface objects into at least a first sub-group of user interface objects and a second sub-group of user interface objects. Next, the portable device displays a first sub-group icon corresponding to the first sub-group of user interface objects and at least one of the second sub-group of user interface objects on the touch screen display (805). In some embodiments, the second predefined sub-condition is similar to the second predefined condition described above in connection with FIG. 6.

If the user-selected group of user interface objects meet a third predefined sub-condition, the portable device divides the group of user interface objects into at least a third sub-group of user interface objects and a fourth sub-group of user interface objects. Next, the portable device displays a third sub-group icon corresponding to the third sub-group of user interface objects and a fourth sub-group icon corresponding to the fourth sub-group of user interface objects on the touch screen display (807). In some embodiments, the third predefined sub-condition is similar to the third predefined condition described above in connection with FIG. 6.

In some embodiments, the device may present the information in a flat view if the total number of user interface objects is slightly more than what can fit into the display. A user can easily scroll the flat view up or down to see the hidden portion using a substantially vertical finger swipe gesture.

Figure 9G:
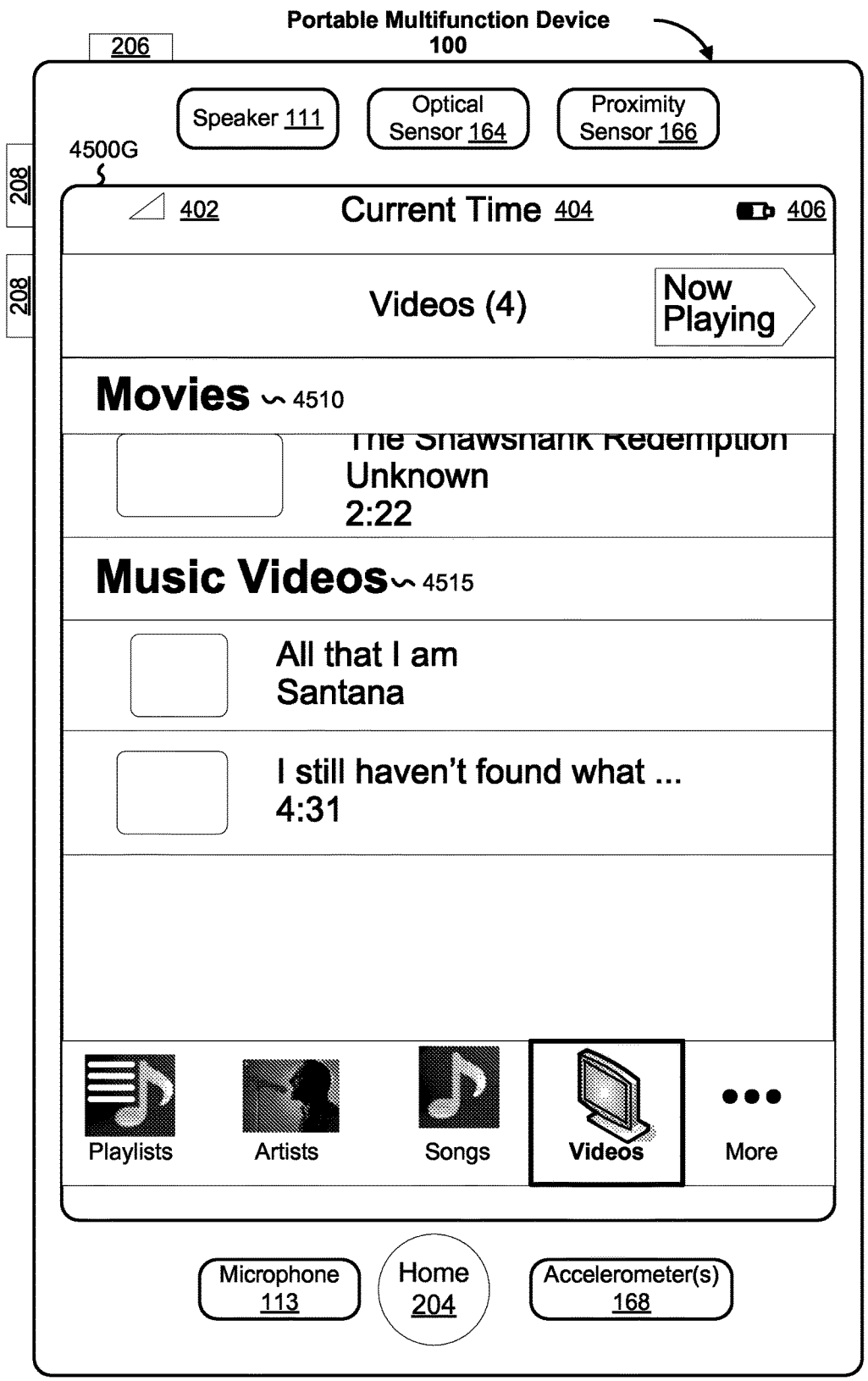

In some embodiments, a unique group identifier is assigned to each group of user interface objects in a flat view. For example, the group labels 4510 and 4515 in FIG. 9G are exemplary group identifiers. When the user scrolls upward the list of user interface objects, the group identifier at the top of the list (e.g., movies 4510) does not move until the last item in the movie group, i.e., The Shawshank Redemption, moves out of the screen. At this time, the movies label 4510 is then replaced by the music videos label 4515.

The foregoing description, for purpose of explanation, has been described with reference to specific embodiments. But the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method implemented at a portable multifunction device with a touch screen display, comprising:
   identifying a first group of user interface objects and a second group of user interface objects, wherein said first group corresponds to a first file system folder, and said second group corresponds to a second file system folder distinct from the first file system folder, and wherein
   a respective user interface object in the first group of user interface objects is associated with a corresponding data file in the first file system folder, and
   a respective user interface object in the second group of user interface objects is associated with a corresponding data file in the second file system folder; and
   automatically displaying objects associated with the first group and the second group in response to the device determining that the first group and the second group meet predefined conditions, including:
   in response to the device determining that the first group and the second group meet a first predefined condition, distinct from a second predefined condition and a third predefined condition, automatically concurrently displaying on the touch screen display objects in the first group of user interface objects, a label for the first group of user interface objects, objects in the second group of user interface objects, and a label for the second group of user interface objects while maintaining data files that correspond to the first group of user interface objects in the first file system folder and data files that correspond to the second group of user interface objects in the second file system folder;

in response to the device determining that the first group and the second group meet the second predefined condition, distinct from the first predefined condition and the third predefined condition, automatically concurrently displaying on the touch screen display
 a first group icon that corresponds to the first group of user interface objects without concurrently displaying objects in the first group of user interface objects, and
 objects in the second group of user interface objects,
 while maintaining the data files that correspond to the first group of user interface objects in the first file system folder and the data files that correspond to the second group of user interface objects in the second file system folder; and
in response to the device determining that the first group and the second group meet the third predefined condition, distinct from the first predefined condition and the second predefined condition, automatically concurrently displaying on the touch screen display
 the first group icon that corresponds to the first group of user interface objects without concurrently displaying objects in the first group of user interface objects and
 a second group icon that corresponds to the second group of user interface objects without concurrently displaying objects in the second group of user interface objects while maintaining the data files that correspond to the first group of user interface objects in the first file system folder and the data files that correspond to the second group of user interface objects in the second file system folder,
wherein the first, second, and third predefined conditions are each based on at least one of the number of objects in the first group of user interface objects and the number of objects in the second group of user interface objects.

2. The method of claim 1, wherein the first predefined condition is that the total number of objects in the first and second groups of user interface objects is equal to or less than a predetermined threshold.

3. The method of claim 1, wherein the first predefined condition is that the total number of objects in the first and second groups of user interface objects is equal to or less than a maximum number of user interface objects that can be simultaneously displayed.

4. The method of claim 1, wherein the second predefined condition is that the number of objects in the first group of user interface objects is greater than a predetermined threshold and the number of objects in the second group of user interface objects is equal to or less than the predetermined threshold.

5. The method of claim 1, wherein the third predefined condition is that the number of objects in the first group of user interface objects is greater than a predetermined threshold and the number of objects in the second group of user interface objects is greater than the predetermined threshold.

6. The method of claim 1, further comprising:
in response to the device determining that the first group and the second group meet the first predefined condition:
 automatically concurrently displaying the objects in the first group of user interface objects and a subset of the objects in the second group of user interface objects on the touch screen display if a total number of objects in the first and second groups is more than a predefined threshold number; and
in response to the device detecting a substantially vertical finger swipe gesture on the touch screen display:
 automatically displaying at least one more object in the second group of user interface objects on the touch screen display, wherein the at least one more object is not in the subset of the objects in the second group of user interface objects previously displayed on the touch screen display.

7. The method of claim 1, including:
while concurrently displaying the first group icon, objects in the second group of user interface objects, and the label for the second group of user interface objects, detecting activation of the first group icon; and,
in response to the device detecting activation of the first group icon:
 ceasing to display the first group icon, the objects in the second group of user interface objects, and the label for the second group of user interface objects, and
 displaying objects in the first group of objects.

8. The method of claim 1, including:
while concurrently displaying the first group icon and the second group icon, detecting activation of the second group icon; and,
in response to the device detecting activation of the second group icon:
 ceasing to display the first group icon and the second group icon, and
 displaying objects in the second group of objects.

9. A portable electronic device, comprising:
a touch screen display;
one or more processors;
memory; and
one or more programs, wherein the one or more programs are stored in the memory and configured to be executed by the one or more processors, the one or more programs including instructions for:
 identifying a first group of user interface objects and a second group of user interface objects, wherein said first group corresponds to a first file system folder, and said second group corresponds to a second file system folder distinct from the first file system folder, and wherein
  a respective user interface object in the first group of user interface objects is associated with a corresponding data file in the first file system folder, and
  a respective user interface object in the second group of user interface objects is associated with a corresponding data file in the second file system folder; and
 automatically displaying objects associated with the first group and the second group in response to the device determining that the first group and the second group meet predefined conditions, including:
  in response to the device determining that the first group and the second group meet a first predefined condition, distinct from a second predefined condition and a third predefined condition, automatically concurrently displaying on the touch screen display
   objects in the first group of user interface objects,
   a label for the first group of user interface objects,
   objects in the second group of user interface objects, and a label for the second group of user interface objects while maintaining data files that correspond to the first group of user interface objects in the first file system folder and data files that correspond to the second group of user interface objects in the second file system folder;

in response to the device determining that the first group and the second group meet the second predefined condition, distinct from the first predefined condition and the third predefined condition, automatically concurrently displaying on the touch screen display a first group icon that corresponds to the first group of user interface objects without concurrently displaying objects in the first group of user interface objects, and objects in the second group of user interface objects, while maintaining the data files that correspond to the first group of user interface objects in the first file system folder and the data files that correspond to the second group of user interface objects in the second file system folder; and in response to the device determining that the first group and the second group meet the third predefined condition, distinct from the first predefined condition and the second predefined condition, automatically concurrently displaying on the touch screen display the first group icon that corresponds to the first group of user interface objects without concurrently displaying objects in the first group of user interface objects and a second group icon that corresponds to the second group of user interface objects without concurrently displaying objects in the second group of user interface objects while maintaining the data files that correspond to the first group of user interface objects in the first file system folder and the data files that correspond to the second group of user interface objects in the second file system folder, wherein the first, second, and third predefined conditions are each based on at least one of the number of objects in the first group of user interface objects and the number of objects in the second group of user interface objects.

10. The device of claim 9, wherein the first predefined condition is that the total number of objects in the first and second groups of user interface objects is equal to or less than a predetermined threshold.

11. The device of claim 9, wherein the first predefined condition is that the total number of objects in the first and second groups of user interface objects is equal to or less than a maximum number of user interface objects that can be simultaneously displayed.

12. The device of claim 9, wherein the second predefined condition is that the number of objects in the first group of user interface objects is greater than a predetermined threshold and the number of objects in the second group of user interface objects is equal to or less than the predetermined threshold.

13. The device of claim 9, wherein the third predefined condition is that the number of objects in the first group of user interface objects is greater than a predetermined threshold and the number of objects in the second group of user interface objects is greater than the predetermined threshold.

14. The device of claim 9, wherein the one or more programs further include instructions for:

in response to the device determining that the first group and the second group meet the first predefined condition:

automatically concurrently displaying the objects in the first group of user interface objects and a subset of the objects in the second group of user interface objects on the touch screen display if a total number of objects in the first and second groups is more than a predefined threshold number; and in response to the device detecting a substantially vertical finger swipe gesture on the touch screen display:

automatically displaying at least one more object in the second group of user interface objects on the touch screen display, wherein the at least one more object is not in the subset of the objects in the second group of user interface objects previously displayed on the touch screen display.

15. The device of claim 9, wherein the one or more programs further include instructions for:

while concurrently displaying the first group icon, objects in the second group of user interface objects, and the label for the second group of user interface objects, detecting activation of the first group icon; and, in response to the device detecting activation of the first group icon:

ceasing to display the first group icon, the objects in the second group of user interface objects, and the label for the second group of user interface objects, and displaying objects in the first group of objects.

16. The device of claim 9, wherein the one or more programs further include instructions for:

while concurrently displaying the first group icon and the second group icon, detecting activation of the second group icon; and, in response to the device detecting activation of the second group icon:

ceasing to display the first group icon and the second group icon, and displaying objects in the second group of objects.

17. A non-transitory computer-readable medium having stored therein instructions, which when executed by a portable electronic device with a touch screen display, cause the device to:

identify a first group of user interface objects and a second group of user interface objects, wherein said first group corresponds to a first file system folder, and said second group corresponds to a second file system folder distinct from the first file system folder, and wherein a respective user interface object in the first group of user interface objects is associated with a corresponding data file in the first file system folder, and a respective user interface object in the second group of user interface objects is associated with a corresponding data file in the second file system folder; and automatically display objects associated with the first group and the second group in response to the device determining that the first group and the second group meet predefined conditions, including:

in response to the device determining that the first group and the second group meet a first predefined condition, distinct from a second predefined condition and a third predefined condition, automatically concurrently display on the touch screen display objects in the first group of user interface objects, a label for the first group of user interface objects,
objects in the second group of user interface objects, and
a label for the second group of user interface objects
while maintaining data files that correspond to the first group of user interface objects in the first file system folder and data files that correspond to the second group of user interface objects in the second file system folder;
in response to the device determining that the first group and the second group meet the second predefined condition, distinct from the first predefined condition and the third predefined condition, automatically concurrently display on the touch screen display
a first group icon that corresponds to the first group of user interface objects without concurrently displaying objects in the first group of user interface objects, and
objects in the second group of user interface objects, while maintaining the data files that correspond to the first group of user interface objects in the first file system folder and the data files that correspond to the second group of user interface objects in the second file system folder; and
in response to the device determining that the first group and the second group meet the third predefined condition, distinct from the first predefined condition and the second predefined condition, automatically concurrently display on the touch screen display
the first group icon that corresponds to the first group of user interface objects without concurrently displaying objects in the first group of user interface objects and
a second group icon that corresponds to the second group of user interface objects without concurrently displaying objects in the second group of user interface objects while maintaining the data files that correspond to the first group of user interface objects in the first file system folder and the data files that correspond to the second group of user interface objects in the second file system folder,
wherein the first, second, and third predefined conditions are each based on at least one of the number of objects in the first group of user interface objects and the number of objects in the second group of user interface objects.

18. The non-transitory computer readable storage medium of claim 17, wherein the first predefined condition is that the total number of objects in the first and second groups of user interface objects is equal to or less than a predetermined threshold.

19. The non-transitory computer readable storage medium of claim 17, wherein the first predefined condition is that the total number of objects in the first and second groups of user interface objects is equal to or less than a maximum number of user interface objects that can be simultaneously displayed.

20. The non-transitory computer readable storage medium of claim 17, wherein the second predefined condition is that the number of objects in the first group of user interface objects is greater than a predetermined threshold and the number of objects in the second group of user interface objects is equal to or less than the predetermined threshold.

21. The non-transitory computer readable storage medium of claim 17, wherein the third predefined condition is that the number of objects in the first group of user interface objects is greater than a predetermined threshold and the number of objects in the second group of user interface objects is greater than the predetermined threshold.

22. The non-transitory computer readable storage medium of claim 17, wherein the instructions further cause the device to:
in response to the device determining that the first group and the second group meet the first predefined condition:
automatically concurrently display the objects in the first group of user interface objects and a subset of the objects in the second group of user interface objects on the touch screen display if a total number of objects in the first and second groups is more than a predefined threshold number; and
in response to the device detecting a substantially vertical finger swipe gesture on the touch screen display:
automatically display at least one more object in the second group of user interface objects on the touch screen display, wherein the at least one more object is not in the subset of the objects in the second group of user interface objects previously displayed on the touch screen display.

23. The non-transitory computer readable storage medium of claim 17, wherein the instructions further cause the device to:
while concurrently displaying the first group icon, objects in the second group of user interface objects, and the label for the second group of user interface objects, detect activation of the first group icon; and,
in response to the device detecting activation of the first group icon:
cease to display the first group icon, the objects in the second group of user interface objects, and the label for the second group of user interface objects, and
display objects in the first group of objects.

24. The non-transitory computer readable storage medium of claim 17, wherein the instructions further cause the device to:
while concurrently displaying the first group icon and the second group icon, detect activation of the second group icon; and,
in response to the device detecting activation of the second group icon:
cease to display the first group icon and the second group icon, and
display objects in the second group of objects.

25. A graphical user interface on a portable electronic device with a touch screen display, a memory, and one or more processors to execute one or more programs stored in the memory, the graphical user interface comprising:
objects associated with a first group of user interface objects, and
objects associated with a second group of user interface objects;
wherein;
said first group corresponds to a first file system folder, and said second group corresponds to a second file system folder distinct from the first file system folder, and
the first group of user interface objects and the second group of user interface objects are identified, wherein a respective user interface object in the first group of user interface objects is associated with a corresponding data file in the first file system folder, and a respective user interface object in the second group of user interface objects is associated with a corresponding data file in the second file system folder; and the objects associated with the first group and the second group are automatically displayed in response to the device determining that the first group and the second group meet predefined conditions, including:

in response to the device determining that the first group and the second group meet a first predefined condition, distinct from a second predefined condition and a third predefined condition, objects in the first group of user interface objects, a label for the first group of user interface objects, objects in the second group of user interface objects, and a label for the second group of user interface objects are automatically concurrently displayed on the touch screen display, while maintaining data files that correspond to the first group of user interface objects in the first file system folder and data files that correspond to the second group of user interface objects in the second file system folder;

in response to the device determining that the first group and the second group meet the second predefined condition, distinct from the first predefined condition and the third predefined condition, a first group icon that corresponds to the first group of user interface objects, and objects in the second group of user interface objects are automatically concurrently displayed on the touch screen display without concurrently displaying objects in the first group of user interface objects, while maintaining the data files that correspond to the first group of user interface objects in the first file system folder and the data files that correspond to the second group of user interface objects in the second file system folder; and in response to the device determining that the first group and the second group meet the third predefined condition, distinct from the first predefined condition and the second predefined condition, the first group icon that corresponds to the first group of user interface objects and a second group icon that corresponds to the second group of user interface objects are automatically concurrently displayed on the touch screen display without concurrently displaying objects in the first group of user interface objects and without concurrently displaying objects in the second group of user interface objects, while maintaining the data files that correspond to the first group of user interface objects in the first file system folder and the data files that correspond to the second group of user interface objects in the second file system folder, wherein the first, second, and third predefined conditions are each based on at least one of the number of objects in the first group of user interface objects and the number of objects in the second group of user interface objects.

\* \* \* \* \*